(12) United States Patent
Nakajima et al.

(10) Patent No.: US 11,136,064 B2
(45) Date of Patent: Oct. 5, 2021

(54) ROTATION DETECTION DEVICE AND STEERING SYSTEM

(71) Applicant: DENSO CORPORATION, Kariya (JP)

(72) Inventors: Nobuyori Nakajima, Kariya (JP); Haruo Suzuki, Kariya (JP); Takashi Suzuki, Kariya (JP); Go Endoh, Kariya (JP); Koichi Nakamura, Kariya (JP); Yosuke Ogi, Kariya (JP); Atsuko Oka, Kariya (JP); Shuji Kuramitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 16/597,176

(22) Filed: Oct. 9, 2019

(65) Prior Publication Data

US 2020/0114967 A1    Apr. 16, 2020

(30) Foreign Application Priority Data

Oct. 11, 2018    (JP) .............................. JP2018-192695

(51) Int. Cl.
  *B62D 15/02*    (2006.01)
  *B60Q 9/00*    (2006.01)
  *B62D 5/04*    (2006.01)

(52) U.S. Cl.
  CPC .............. *B62D 15/021* (2013.01); *B60Q 9/00* (2013.01); *B62D 5/049* (2013.01); *B62D 5/0463* (2013.01)

(58) Field of Classification Search
  CPC .... B62D 15/021; B62D 5/0463; B62D 5/049; B60Q 9/00

USPC ......................................................... 701/41
See application file for complete search history.

(56) References Cited

U.S. PATENT DOCUMENTS

| 2015/0239501 | A1 | 8/2015 | Fujita et al. |
| 2016/0223363 | A1* | 8/2016 | Fujita ................. G01D 5/24461 |
| 2017/0001661 | A1* | 1/2017 | Nakamura ........... B62D 5/0487 |
| 2017/0291640 | A1 | 10/2017 | Fujita et al. |

FOREIGN PATENT DOCUMENTS

| JP | 5958572 B2 | 8/2016 |
| JP | 2017-191092 A | 10/2017 |

OTHER PUBLICATIONS

U.S. Appl. No. 16/597,145, filed Oct. 9, 2019, Oct. 9, 2019, Haruo Suzuki, et al.

* cited by examiner

*Primary Examiner* — Gertrude Arthur Jeanglaude
(74) *Attorney, Agent, or Firm* — Maschoff Brennan

(57) ABSTRACT

A rotation detection device includes a plurality of detectors each including a plurality of calculators respectively calculating a detection value. A control unit of the rotation detection device monitors abnormality of detection values respectively detected by the plurality of detectors, and, when determining abnormality, identifies a calculator calculating an abnormal detection value based on a result of comparison between the detection values of the plurality of calculators. Then, the control unit continues calculation of an absolute angle by using the detection values from the calculators other than the identified calculator.

11 Claims, 15 Drawing Sheets

ROTATION DETECTION DEVICE AND STEERING SYSTEM

CROSS REFERENCE TO RELATED APPLICATION

The present application is based on and claims the benefit of priority of Japanese Patent Application No. 2018-192695, filed on Oct. 11, 2018, the disclosure of which is incorporated herein by reference.

TECHNICAL FIELD

The present disclosure generally relates to a rotation detection device detecting a detection value indicative of a rotation state of a detection target and a steering system including the rotation detection device.

BACKGROUND INFORMATION

In the related art, a rotation detection device exists that detects a rotation state of a detection target, and calculates rotation information associated with the rotation of the detection target based on a detection value. The rotation device of the related art includes a motor provided as a detection target, and detects a rotation angle and a number of rotations of the motor. The related art rotation detection device (i) compares the number of rotations of the motor and a rotation angle of the motor and (ii) determines whether or not there is an abnormality in the number of rotations.

When the detection value detected by the related art rotation detection device is abnormal, there is a possibility that the rotation information cannot be appropriately calculated based on the detection value. Therefore, it is conceivable to forcibly stop the calculation of the rotation information when an abnormality of the detection value occurs. However, stopping the calculation of the rotation information may lead to stopping control of a drive target by using the rotation information.

SUMMARY

It is an object of the present disclosure to provide a rotation detection device that is capable of continuing, even when having an abnormality in a detection value that is output according to a rotation of a detection target, a calculation of rotation information while suppressing influence of the abnormality of the detection value on a drive object.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
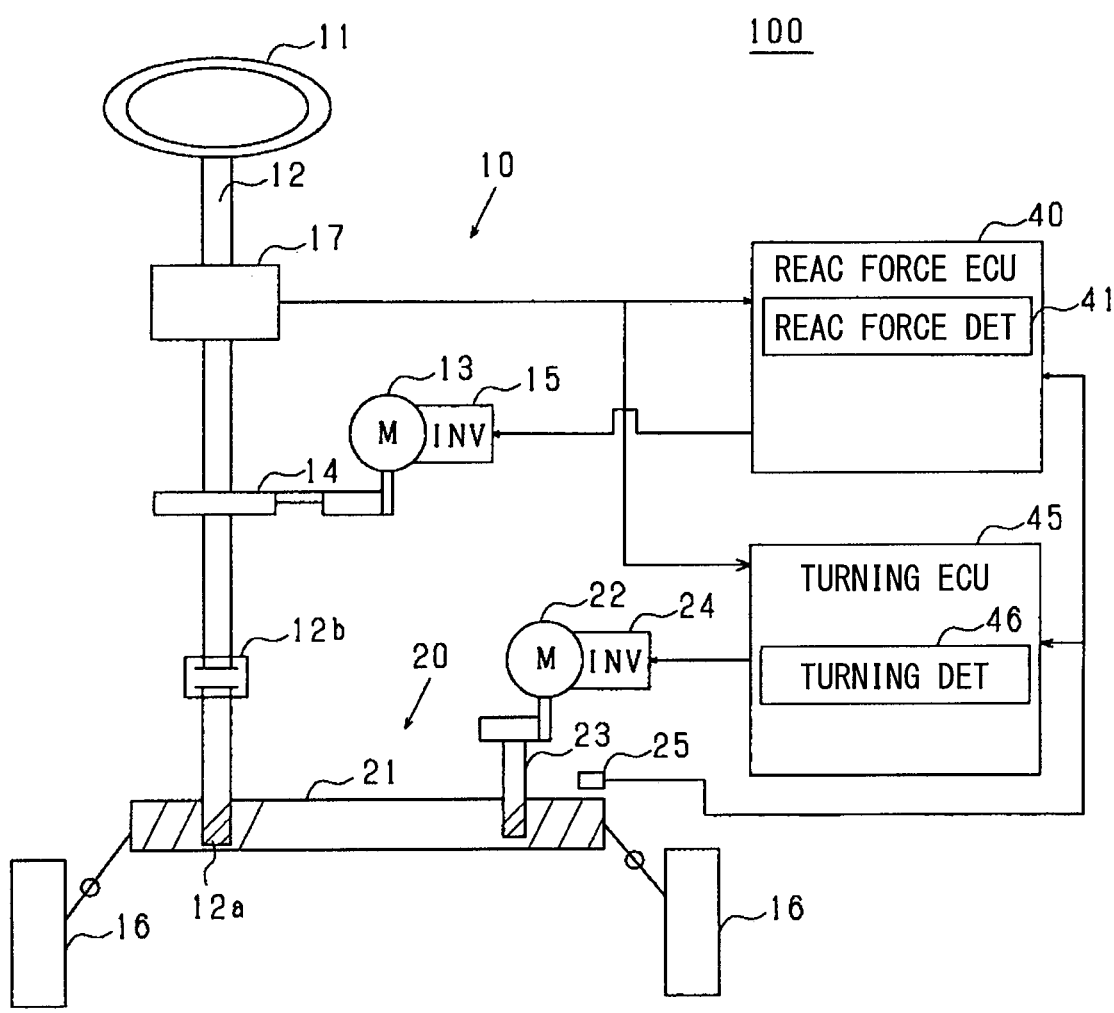
FIG. 1 is a schematic diagram of a steering system.

Hereinafter, a steer-by-wire steering system applied to a vehicle is described as a steering system according to the present embodiment. A steering system 100 shown in FIG. 1 includes a steering device 10 that receives a driver's steering operation, and a turning device 20 that turns a direction of the tire(s) 16 according to the amount of steering operation received by the steering device 10.

The steering device 10 includes a steering wheel 11 which is rotated by a driver, a steering shaft 12 which is rotated with the rotation of the steering wheel 11, and a reaction force motor 13. The reaction force motor 13 is connected to the steering shaft 12 via a steering side speed reduction gear 14, and applies a reaction force according to the driver's operation of the steering wheel 11. In the present embodiment, the reaction force motor 13 is an alternating current (AC) motor that is rotationally driven by AC electric power. Further, the reaction force motor 13 is connected to a battery via an inverter 15. The inverter 15 converts a direct current (DC) electric power from the battery into the AC power and supplies electric power to the reaction force motor 13.

In the present embodiment, a pinion shaft 12a is provided on a tip end side of the steering shaft 12 via a clutch 12b. During normal operation of the vehicle, the clutch 12b is in an open state, and the rotation of the steering shaft 12 is not transmitted to the pinion shaft 12a. For example, when the clutch 12b is closed due to an abnormality or the like of the steering system 100, the rotation of the steering shaft 12 is transmitted to the pinion shaft 12a.

The turning device 20 includes a rack shaft 21 that changes the direction of the tires 16 and a turning motor 22. The tires 16 are connected to both ends of the rack shaft 21 via tie rods. The turning motor 22 is connected to the rack shaft 21 via the turning side speed reduction gear 23, and applies a turning force which is a force to change the direction of the tire 16 to the rack shaft 21. The turning motor 22 is connected to the battery via the inverter 24. The inverter 24 converts a direct current electric power from the battery into an alternating current electric power, and supplies power to the turning motor 22.

In the present embodiment, the pinion shaft 12a engages with the rack shaft 21. When the clutch 12b is open, the steering shaft 12 is not mechanically connected to the rack shaft 21. Therefore, the rotation of the steering shaft 12 accompanying the driver's operation of the steering wheel 11 is not converted into a linear motion of the rack shaft 21. On the other hand, in the closed state of the clutch 12b, the steering shaft 12 is mechanically connected to the rack shaft 21. Therefore, the rotational motion of the steering shaft 12 accompanying the driver's operation of the steering wheel 11 is converted into the linear motion of the rack shaft 21.

The steering shaft 12 of the steering device 10 is provided with a torque sensor 17 that detects a steering torque according to the driver's steering operation. Further, on the rack shaft 21 of the turning device 20, a rack stroke sensor 25 for detecting a displacement amount X which is a linear motion amount of the rack shaft 21 is provided. In the present embodiment, the rack stroke sensor 25 corresponds to an external sensor.

The steering system 100 includes a reaction force ECU 40 as a reaction force controller, and a turning ECU 45 as a turning controller. The reaction force ECU 40 and the turning ECU 45 respectively have a central processing unit (CPU) and a memory (not shown) and a memory, and a program stored in the memory and executed by the CPU controls power supply to the reaction force motor 13 and the turning motor 22.

The reaction force ECU 40 calculates a reaction force torque instruction value, i.e., an instruction of torque to the reaction force motor 13, based on (i) a reaction force absolute angle A1 indicating the rotation amount (i.e., an absolute angle) of the steering shaft 12 accompanying the driver's steering operation, (ii) a steering torque Th and (iii) a vehicle speed Vc. Further, based on the reaction force torque instruction value, an operation signal for operating the inverter 15 is calculated. The absolute angle is a value that indicates the rotation angle of the steering wheel 11 for rotating the steering wheel 11 from a neutral position corresponding to a straight travel of the vehicle to a position corresponding to a right-most limit turn angle or a left-most limit turn angle of the tires 16.

The reaction force ECU 40 includes, as a rotation detection device, a reaction force detector 41 that calculates a reaction force absolute angle A1 based on a detection value indicating a rotation state of the reaction force motor 13. The reaction force detector 41 calculates, as detection values, a rotation angle θm of the reaction force motor 13 and a number of rotations TC indicating the number of rotations of the reaction force motor 13 by a unit of a predetermined angle (e.g., by a unit of 360 degrees). For example, the reaction force motor 13 is provided with a magnet that rotates integrally with the rotor or with the rotation shaft, and the reaction force detector 41 calculates the rotation angle θm and the number of rotations TC of the motor 13 based on the change of the magnetic field cause by the rotation of the magnet.

The turning ECU 45 calculates a turning torque instruction value as an instruction of torque to the turning motor 22 based on (i) a turning absolute angle A2 indicating the rotation amount (i.e., an absolute angle of rotation) of the steering shaft 12, (ii) the displacement amount X, (iii) the steering torque Th, and (iv) the vehicle speed Vc. Then, based on the turning torque instruction value, an operation signal for operating the inverter 24 is calculated.

The turning ECU 45 includes, as a rotation detection device, a turning detector 46 that calculates the turning absolute angle A2 based on a detection value indicating the rotation state of the turning motor 22. The turning detector 46 calculates, as detection values, the rotation angle θm of the turning motor 22 and the number of rotations TC indicating the number of rotations of the turning motor 22 by a unit of a predetermined angle (e.g., by a unit of 360 degrees).

For example, the turning motor 22 is provided with a magnet that rotates integrally with the rotor or with the rotation shaft, and the turning detector 46 calculates the rotation angle θm and the number of rotations TC of the turning motor 22 based on the change of the magnetic field caused by the rotation of the magnet.

Figure 2A:
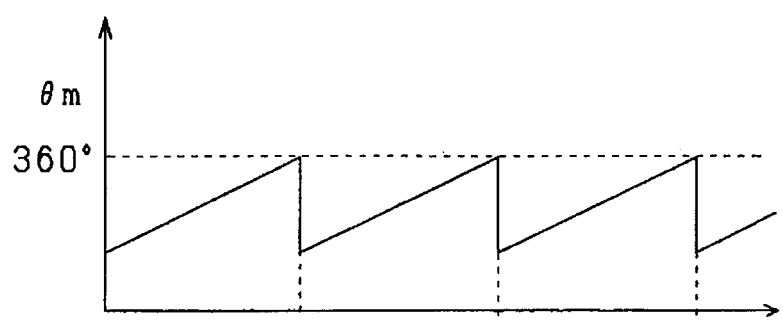
FIGS. 2A, 2B, 2C are collectively used as a diagram of a relationship between a rotation angle, a number of rotations and an absolute angle.
Figure 2B:
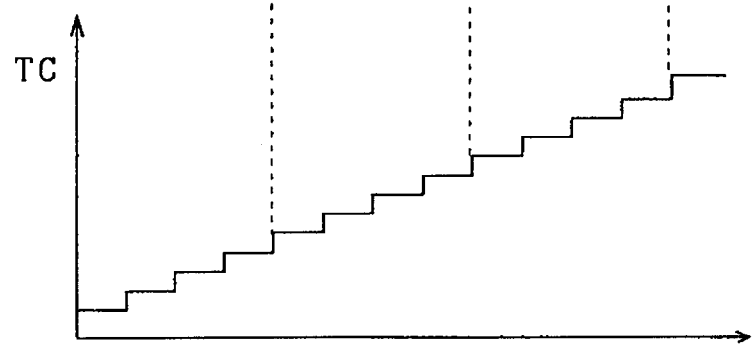
Figure 2C:
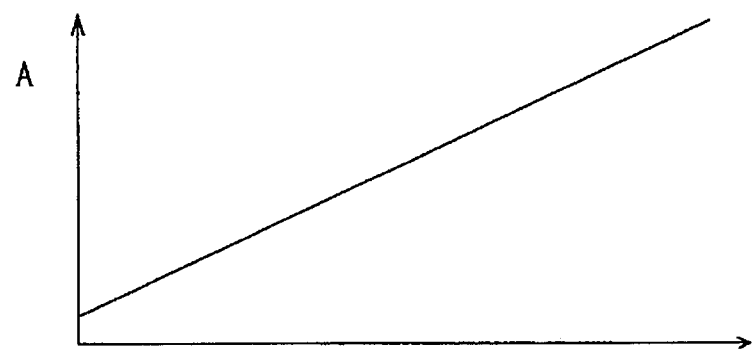

FIG. 2A shows the rotation angle θm, FIG. 2B shows the number of rotations TC, and FIG. 2C shows the absolute angle A.

A gear ratio for the steering shaft 12 is set to a value so that the steering shaft 12 rotates more than once (i.e., more than 360 degrees) while the steering wheel 11 is rotated from the neutral position to the position corresponding either to the right-most or the left-most limit turn angle of the tire 16. On the other hand, the rotation angle θm indicates the rotation angle of up to one rotation of each of the motors 13, 22 (i.e., up to 360°). Therefore, it may be understood that the rotation angle θm is a relative angle in comparison to the absolute angle A. Further, the number of rotations TC is a value counted up for rotation of every angle area, which may be an area defined by dividing one rotation of each of the motors 13 and 22 (i.e., 360°) by a preset number. That is, in the present embodiment, an angle area is set as an area of 90 degrees, and the number of rotations TC is counted up by the rotation of every 90 degrees of the motors 13, 22. In the present embodiment, the absolute angle A is calculated from the rotation angle θm and the number of rotations TC using the following equation (1).

$$A = INT(TC/k) \times 360 + \theta m \tag{1}$$

INT(TC/k) represents a quotient obtained by dividing the number of rotations TC by the number k (i.e., the number of rotations TC when the motors 13, 22 makes one rotation).

The reaction force ECU 40 learns a neutral position Ma of the steering wheel 11, which is used for a control of the reaction force motor 13, by using the reaction force absolute angle A1 calculated by the reaction force detector 41 in a straight travel of the vehicle for a preset period of time. The turning ECU 45 learns a neutral position Mb of the steering wheel 11, which is used for a control of the turning motor 22, by using the turning absolute angle A2 calculated by the turning detector 46 in a straight travel of the vehicle for a preset period of time.

Here, when an abnormality occurs in the detection values θm and TC calculated by the detectors 41 and 46, the absolute angle A (e.g., A1 and A2), which is rotation information calculated based on the detection values θm and TC, may be not a value for appropriately controlling the motors 13 and 22.

Therefore, in consideration of vehicle safety, it is conceivable to forcibly stop the calculation of the absolute angle A when it is determined that the detection values θm and TC are abnormal. However, by stopping calculation of the absolute angle A, control of the steering system 100 cannot be continuable, thereby leading to the stop of the vehicle.

Therefore, when the reaction force ECU 40 and the turning ECU 45, or at least one of them, have abnormal detection values (i.e., are determined to have an abnormal detection value), a calculator calculating the abnormal detection value (θm, TC) is determined and such an abnormal detection value is replaced with a normal value from the other calculator, for the continuation of calculation of the absolute angle A.

Next, configurations of the reaction force detector 41 and the turning detector 46 are described.

Figure 3:
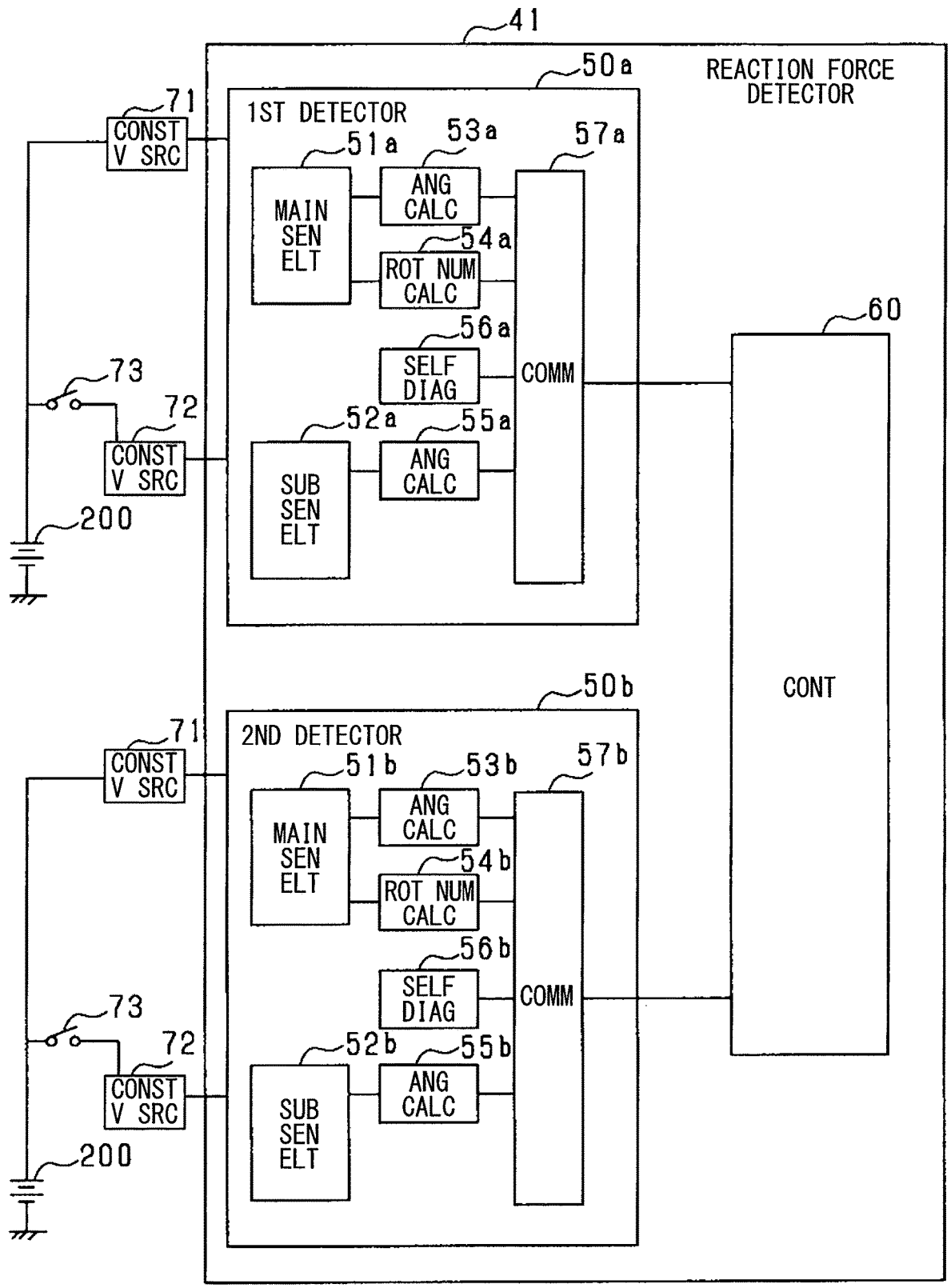
FIG. 3 is a block diagram of a reaction force detector.

As shown in FIG. 3, the reaction force detector 41 includes a first detector 50a and a second detector 50b that calculate detection values according to the rotation of the reaction force motor 13, and includes a control unit 60.

The first detector 50a includes a main sensor element 51a, a sub sensor element 52a, an angle calculator 53a, a rotation number calculator 54a, an angle calculator 55a, a self-diagnosis unit 56a, and a communication unit 57a.

The main sensor element 51a and the sub sensor element 52a are provided as, for example, a Hall element or an MR element, and detect a rotating magnetic field that changes due to the rotation of the magnet accompanying the rotation of the reaction force motor 13.

The angle calculator 53a calculates the rotation angle θm of the reaction force motor 13 based on an output value from the main sensor element 51a. The angle calculator 55a calculates the rotation angle θm of the reaction force motor 13 based on an output value from the sub sensor element 52a. The rotation number calculator 54a calculates the number of rotations TC of the reaction force motor 13 based on an output value of the main sensor element 51a. The rotation angle calculated by the angle calculator 53a may be designated as a rotation angle θm1, and the rotation angle calculated by the angle calculator 55a may be designated as a rotation angle θm2, for the distinction therebetween.

The self-diagnosis unit 56a monitors a power supply abnormality such as a power fault or a ground fault regarding each of the sensor elements 51a and 52a, each of the angle calculators 53a and 55a, and the rotation number calculator 54a. Further, the self-diagnosis unit 56 outputs a result of a self-diagnosis as a status signal SS.

The communication unit 57a is provided as, for example, a serial interface, and can communicate with the control unit 60. The communication unit 57a receives the rotation angle θm, the number of rotations TC, and the status signal SS, and generates an output signal including the values θm, TC, and SS. The communication unit 57a outputs an output signal to the control unit 60 by digital communication such as SPI (Serial Peripheral Interface) communication. In the present embodiment, the communication unit 57a outputs an output signal to the control unit 60 in response to a request from the control unit 60. A communication frame of the output signal includes, in addition to the rotation angle θm, the number of rotations TC, and the status signal SS, a run counter signal and a CRC signal as an error detection signal. Note that the error detection signal may be other than a CRC signal, such as a checksum signal or the like.

The second detector 50b includes a main sensor element 51b, a sub sensor element 52b, an angle calculator 53b, a rotation number calculator 54b, an angle calculator 55b, a self-diagnosis unit 56b, and a communication unit 57b. The functions of the units 51b to 57b that constitute the second detector 50b are the same as the functions of the units 51a to 57a that constitute the first detector 50a, and thus the description thereof is omitted.

The control unit 60 calculates the reaction force absolute angle A1 using the rotation angle θm and the number of rotations TC included in the output signal from the first detector 50a or from the second detector 50b. The control unit 60 sets, as a detection value, any one of combinations of the rotation angles θm and the numbers of rotations TC that are included in the output signals, for calculating the reaction force absolute angle A1.

The control unit 60 monitors the presence or absence of abnormality of the detection value used for calculation of the reaction force absolute angle A1. In the present embodiment, the control unit 60 uses the values θm, TC, SS, and CRC included in the output signal to determine the presence or absence of abnormality of the detection value used for the calculation of the reaction force absolute angle A1. More specifically, the presence or absence of abnormality in the detection value is determined by the following method.

The detection value is determined as having abnormality when a difference between an angle range of the reaction force motor 13 determined by the rotation angle θm and an angle range of the reaction force motor 13 determined by the number of rotations TC is equal to or greater than a predetermined value.

The detection value is determined as having abnormality when the status signal SS indicates a power supply abnormality.

The detection value is determined as having abnormality when it is determined by calculation of using the SRS signal that the output signal has communication abnormality.

When it is determined that the detection value used for the calculation of the reaction force absolute angle A1 is abnormal, the control unit 60 identifies a target calculator that calculates an abnormal rotation angle θm from among the calculators that calculate the detection values. Then, the control unit 60 continues the calculation of the reaction force absolute angle A1 by using a rotation angle θm other than the rotation angle θm calculated by the identified target calculator.

Figure 4:
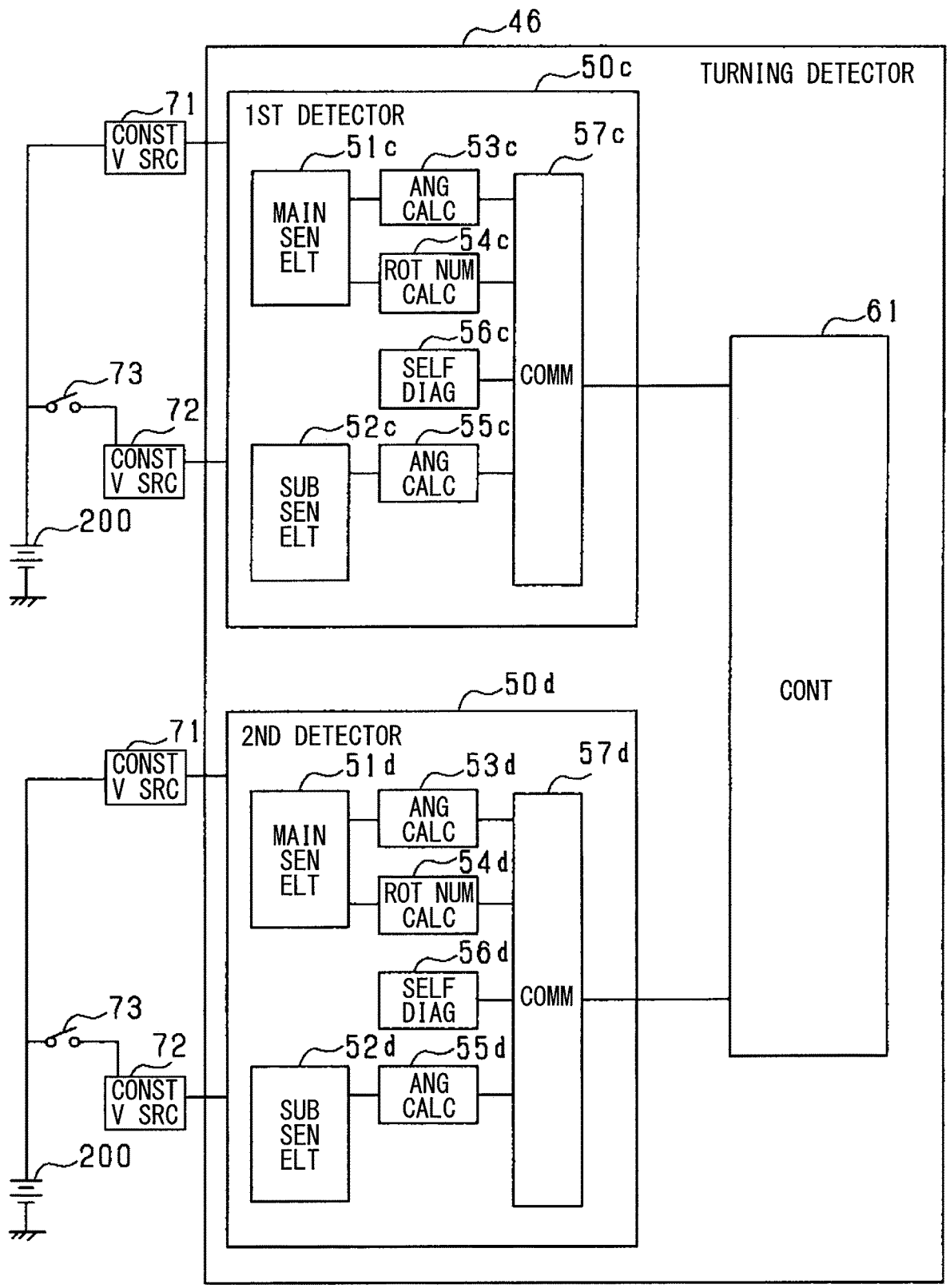
FIG. 4 is a block diagram of a turning detector.

As shown in FIG. 4, the turning detector 46 of the turning ECU 45 includes a first detector 50c and a second detector 50d that calculate detection values θm and TC according to the rotation of the turning motor 22. The first and second detectors 50c and 50d included in the turning detector 46 have the same functions as the first and second detectors 50a and 50b in the reaction force detector 41 of the reaction ECU 40, except for a detection target, i.e., a detection target of the detectors 50c and 50d is the turning motor 22. Therefore, the specific description of the turning detector 46 is omitted from the embodiment.

The control unit 61 of the turning detector 46 calculates the turning absolute angle A2 using the detection values θm and TC included in the output signal from the first detector 50c or from the second detector 50d.

The control unit 61 monitors the presence or absence of abnormality of the detection value used for calculation of the turning absolute angle A2. The control unit 61 uses the values θm, TC, SS, and CRC included in the output signal to determine the presence or absence of abnormality of the detection value used for the calculation of the turning absolute angle A2.

When it is determined that the detection value used for the calculation of the turning absolute angle A2 is abnormal, the control unit 61 identifies a target calculator that calculates an abnormal rotation angle θm from among the calculators that calculate the detection values. Then, the control unit 61 continues the calculation of the turning absolute angle A2 by using a rotation angle θm other than the rotation angle θm calculated by the identified target calculator.

Electric power is supplied to the reaction force detector 41 and the turning detector 46 from a battery 200 via constant voltage sources 71 and 72. In the present embodiment, the electric power from the battery 200 is supplied to each of the rotation number calculators 54*a* to 54*d* via the constant voltage source 71 without passing through an SMR relay 73. That is, even when the SMR relay 73 is open due to an ignition switch being turned OFF, the rotation number calculators 54*a* to 54*d* continue to receive supply of electric power from the battery 200, and calculation of the number of rotations TC is continuable. On the other hand, when the SMR relay 73 is in the open state, the electric power from the battery 200 is not supplied to angle calculators 53*a* to 53*d* and 55*a* to 55*d*, thereby the rotation angle θm is not calculable.

Figure 5:
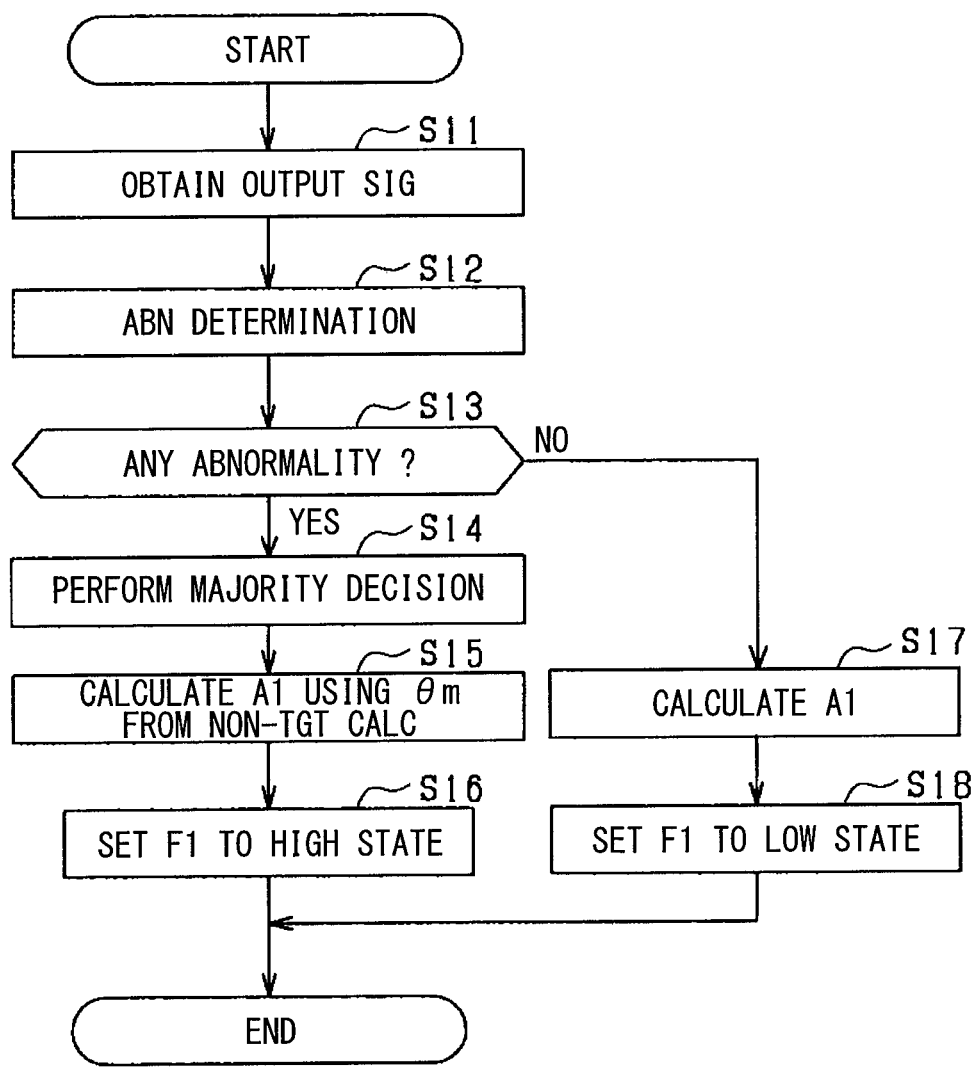
FIG. 5 is a flowchart of a calculation procedure of a reaction force absolute angle.

Next, the calculation of the reaction force absolute angle A1 is described with reference to FIG. 5. The process shown in FIG. 5 is repeatedly performed by the control unit 60 of the reaction force detector 41 at a predetermined cycle.

At step S11, an output signal including the detection values θm and TC is obtained. As an example, it is assumed that the reaction force absolute angle A1 is calculated from the detection values θm and TC detected by the first detector 50*a*. Therefore, the output signals obtained at step S11 include the detection values θm1, θm2, and TC detected by the first detector 50*c*50*a*.

At step S12, the presence or absence of abnormality in the rotation angle θm used for calculation of the reaction force absolute angle A1 is determined by using each value θm, TC, SS, and CRC that are included in the output signal obtained at step S11.

When it is determined by abnormality determination at step S12 that the abnormality is not occurring in the rotation angle θm with which the reaction force absolute angle A1 is calculated, step S13 is determined as negative and the process proceeds to step S17. Steps S12 and S13 correspond to a monitor.

At step S17, the reaction force absolute angle A1 is calculated by using the rotation angle θm and the number of rotations TC, which are set as detection values to be used for calculation of the reaction force absolute angle A1. In such case, the reaction force absolute angle A1 is calculated without changing the rotation angle θm.

Step S18 sets an abnormality notification flag F1 to a low state. The abnormality notification flag F1 indicates the presence or absence of abnormality in any of the calculators that calculate the detection value, and indicates (i) that an abnormality is occurring in any calculator in the high state, and (ii) that no abnormality is occurring in the low state.

On the other hand, when it is determined by abnormality determination at step S12 that the abnormality is occurring in the rotation angle θm with which the reaction force absolute angle A1 is calculated, the process proceeds to step S14. At step S14, the rotation angles θm1 and θm2 calculated by the angle calculators 53*a* and 55*a* of the first detector 50*a* and the rotation angles θm3 and θm4 calculated by the angle calculators 53*b* and 55*b* of the second detector 50*b* are used to implement a majority decision. In the present embodiment, among the angle calculators 53*a* and 55*a* included in the first detector 50*a*, the target calculator calculating an abnormal rotation angle θm is identified by a majority decision. Note that the rotational angles θm1 to θm4 are respectively obtained as a value sampled at the same timing. Step S14 corresponds to an identifier.

In the present embodiment, as the majority decision, among the rotation angles θm1 and θm2, one having a low degree of matching with the rotation angles θm3 and θm4 is determined as an abnormal value. Then, one of the angle calculators 53*a* and 55*a* that calculates a value determined to have a low degree of matching is identified as a target calculator in which abnormality is occurring. The degree of matching is determined by the number of rotation angles θm3 and θm4 having a less-than-preset-value difference with respect to the rotation angles θm1 and θm2. For example, when an abnormality is occurring in the angle calculator 53*a* due to a power supply abnormality, the number of the rotation angles θm3 and θm4 having a difference of less than a preset value with respect to the rotation angle θm1 is zero. On the other hand, the number of the rotation angles θm3 and θm4 having a difference of less than a preset value with respect to the rotation angle θm2 is two. In such case, the degree of matching of the rotation angle θm1 from the angle calculator 53*a* is lower than that of the rotation angle θm2 from the angle calculator 55*a*.

At step S15, the reaction force absolute angle A1 is calculated by using the rotation angles θm from the angle calculators other than the target calculator identified at step S14 (i.e., "CALCULATE A1 USING θm FROM NON-TGT CALC" at S15 in FIG. 5). For example, when the angle calculator 53*a* is identified as a target calculator in which abnormality is occurring, the reaction force absolute angle A1 is calculated by using the rotation angle θm2 from the angle calculator 55*a*. Steps S15 and S17 correspond to an information calculator.

In a situation where the reaction force detector 41 has abnormality, it is desirable to promptly notify the driver of the abnormality in consideration of vehicle safety. Therefore, at step S16, the abnormality notification flag F1 is set to a high state, indicating an abnormality occurring situation in which the reaction force detector 41 has an abnormality. Then, the series of processes shown in FIG. 5 is once ended.

Figure 6:
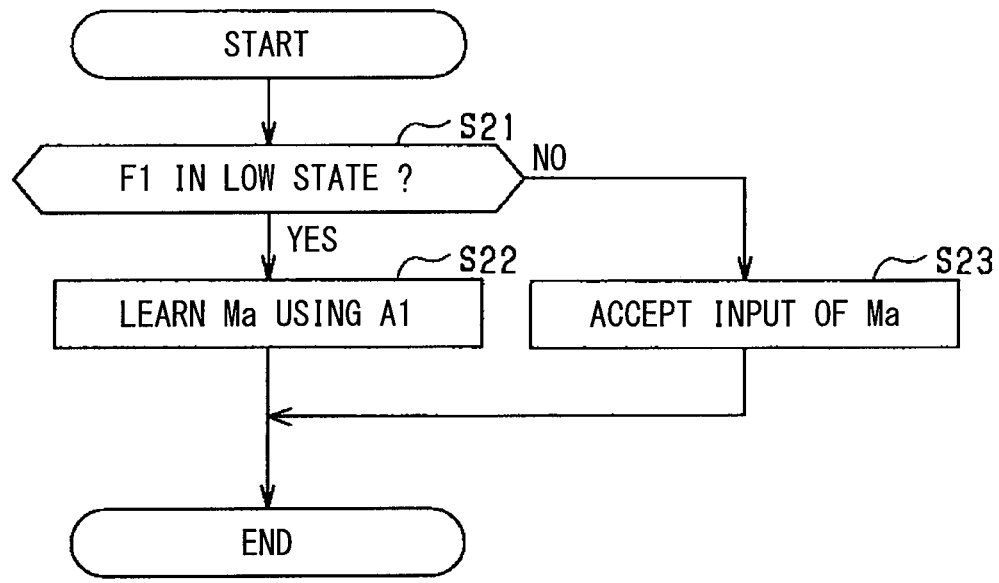
FIG. 6 is a flowchart of a calculation procedure of a neutral position.

Next, storage of the neutral position Ma using the reaction force absolute angle A1 calculated by the process of FIG. 5 is described with reference to FIG. 6. The process shown in FIG. 6 is performed by the reaction force ECU 40, for example, on condition that the ignition switch of the vehicle is turned ON. At step S21, it is determined whether the abnormality notification flag F1 is in the low state. When it is determined that the abnormality notification flag F1 is in the low state, the process proceeds to step S22. In such case, since no abnormality is occurring in the reaction force detector 41, the neutral position Ma is learned at step S22 by using the reaction force absolute angle A1, and a learned value is stored. Then, the series of processes shown in FIG. 6 is once ended.

The devices of the reaction force side (e.g., devices in the reaction force detector 41) are considered to be less affected by the abnormality of the reaction force detector 41 than the devices of the turning mechanism (e.g., devices in the turning detector 46) in terms of the influence on the travel of the vehicle. Therefore, when it is determined that the abnormality notification flag F1 is in the high state, the travel of the vehicle is prioritized at step S23 by accepting an input of the neutral position Ma from the driver. For example, by prioritizing the travel of the vehicle, the driver can quickly take the vehicle to a repair shop or the like, and have a mechanic or the like repair the abnormality of the reaction force detector 41.

The following effects are achievable according to the present embodiment described above.

The control unit 60 monitors the presence or absence of abnormality in the detection value used to calculate the reaction force absolute angle A1. When it is determined that abnormality is occurring in the detection value, the target calculator calculating the abnormal rotation angle θm is identified based on the comparison result of the rotation angles θm respectively output from the calculators 53*a*, 53*b*, 55a, and 55b. Then, calculation of the reaction force absolute angle A1 is continued by using the rotation angles θm calculated by calculators other than the identified target calculator. In such case, even when abnormality is occurring in one of the calculators, it is possible to continue the calculation of the reaction force absolute angle A1 while suppressing the adverse effect on the reaction force motor 13 due to the abnormality of the detection value.

The reaction force ECU 40 stores the value input by the driver as the neutral position Ma when it is determined that the detection value used in the calculation of the reaction force absolute angle A1 is abnormal. In such case, by avoiding the disablement of the travel of the vehicle, the driver can promptly drive the vehicle to the repair shop or the like, and can have the mechanic or the like to repair the abnormality of the reaction force detector 41.

Modification of First Embodiment

The reaction force ECU 40 may use the reaction force absolute angle A1 calculated at step S15 for continuing the learning of the neutral position Ma of the reaction force motor 13, when it is determined that the detection value used for the calculation of the reaction force absolute angle A1 is abnormal. In such case, disablement of the travel of the vehicle is avoidable.

As the rotation angle θm used in the calculation of the reaction force absolute angle A1 at step S15, one of the rotation angles θm1 to θm4 having the highest degree of matching with other rotation angles θm may be used. In such case, for example, when it is determined that the rotation angle θm3 detected by the second detector 50b is the one with the highest degree of matching, the rotation angle θm3 detected by the second detector 50b and the number of rotations TC1 detected by the first detector 50a are used to calculate the reaction force absolute angle A1.

Second Embodiment

The second embodiment is different from the first embodiment with the following points as described below. In the second embodiment, the same structural parts are designated with the same reference numerals as the first embodiment for simplification of description.

In the steering control of the vehicle, it is considered that the abnormality of the turning detector 46 may have greater influence on the travel of the vehicle in terms of comparison between the tire turning side device and the reaction force side device. Therefore, in the present embodiment, when it is determined that abnormality is occurring in any of the calculators in the turning detector 46, in consideration of the vehicle safety, the setting of the neutral position Mb in case of having abnormality in the turning detector 46 is made different from that on the reaction force side.

Figure 7:
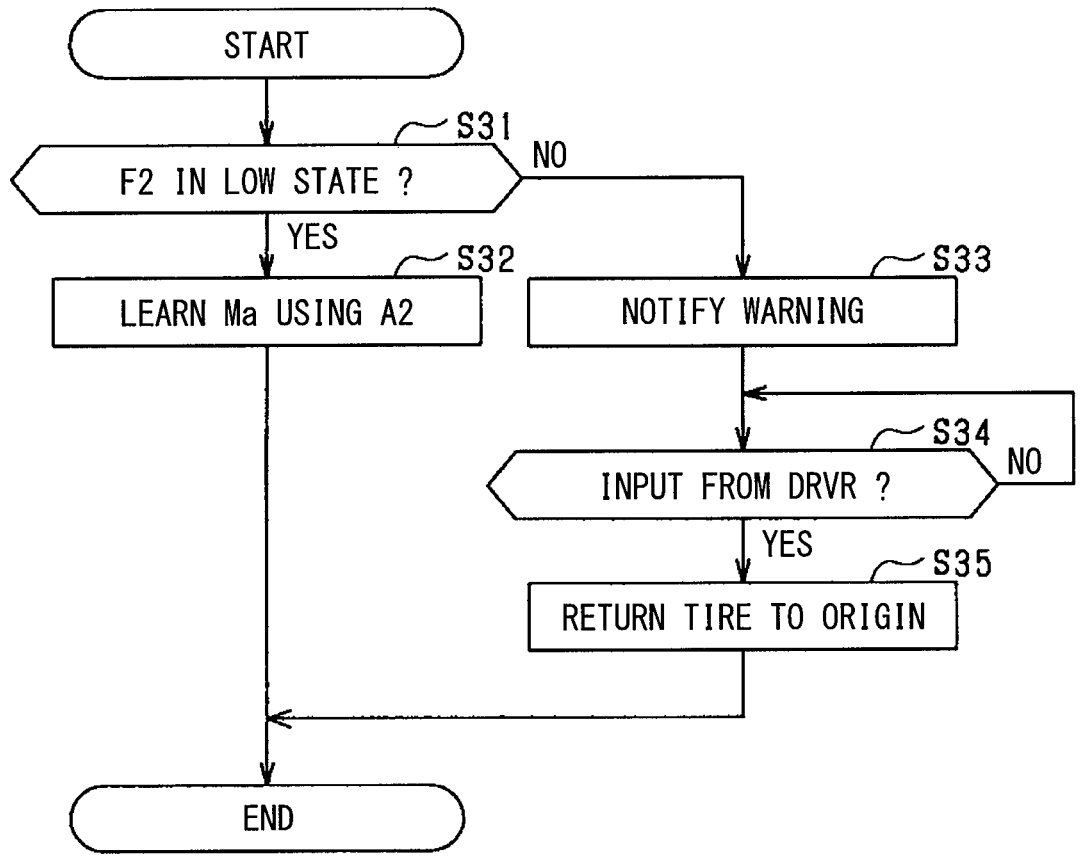
FIG. 7 is a flowchart of the calculation procedure of the neutral position according to a second embodiment of the present disclosure.

The process shown in FIG. 7 is performed by the turning ECU 45 in a predetermined cycle. The process shown in FIG. 7 is performed by the turning ECU 45, for example, on condition that the ignition switch of the vehicle is turned ON.

At step S31, it is determined whether or not an abnormality notification flag F2 is in a low state, indicating that a calculator in the turning detector 46 is abnormal. The abnormality notification flag F2 is set at step S16 by the control unit 61 of the turning detector 46 performing the process of FIG. 5. When it is determined that the abnormality notification flag F2 is in the low state, the process proceeds to step S32, and the neutral position Mb is learned by using the turning absolute angle A2.

On the other hand, when it is determined that the abnormality notification flag F2 is in the high state, a warning is provided to the driver at step S33. For example, when a display device (e.g., an LCD display) is installed in a vehicle compartment, an icon or the like may be displayed on a screen of the display device to indicate that an abnormality is occurring in the turning detector 46. Step S33 corresponds to a warning unit.

At step S34, it is determined whether the driver has received an input from the driver for returning the direction of the tire 16 to a predetermined direction. That is, a direction of the tire 16 that is determined in advance as a direction of straight travel of the vehicle. When an input from the driver is received for returning the direction of the tire 16 to the predetermined direction, the process proceeds to step S35, and the rotation of the turning motor 22 is controlled such that the direction of the tire 16 becomes a direction according to the predetermined direction.

The following effects are achievable in the present embodiment described above.

The turning ECU 45 warns the driver when it is determined that an abnormality is occurring in any of the calculators in the turning detector 46. In such case, it may make the driver aware that the abnormality of the calculator affects the steering operation of the vehicle.

When the turning ECU 45 determines that an abnormality is occurring in any of the calculators in the turning detector 46, the turning motor 22 is controlled according to an input from the driver, so as to change the direction of the tire 16 to the predetermined direction, which is a direction for a straight travel of the vehicle. In such case, even when an abnormality is occurring in the calculator of the turning detector 46, the travel of the vehicle is continuable with the direction of the tire 16 returned to the predetermined direction (i.e., a straight travel of the vehicle is at least made possible).

Third Embodiment

The third embodiment is different from the first embodiment for the following points as described below. In the third embodiment, the same structural parts are designated with the same reference numerals as the first embodiment for simplification of description.

Figure 8:
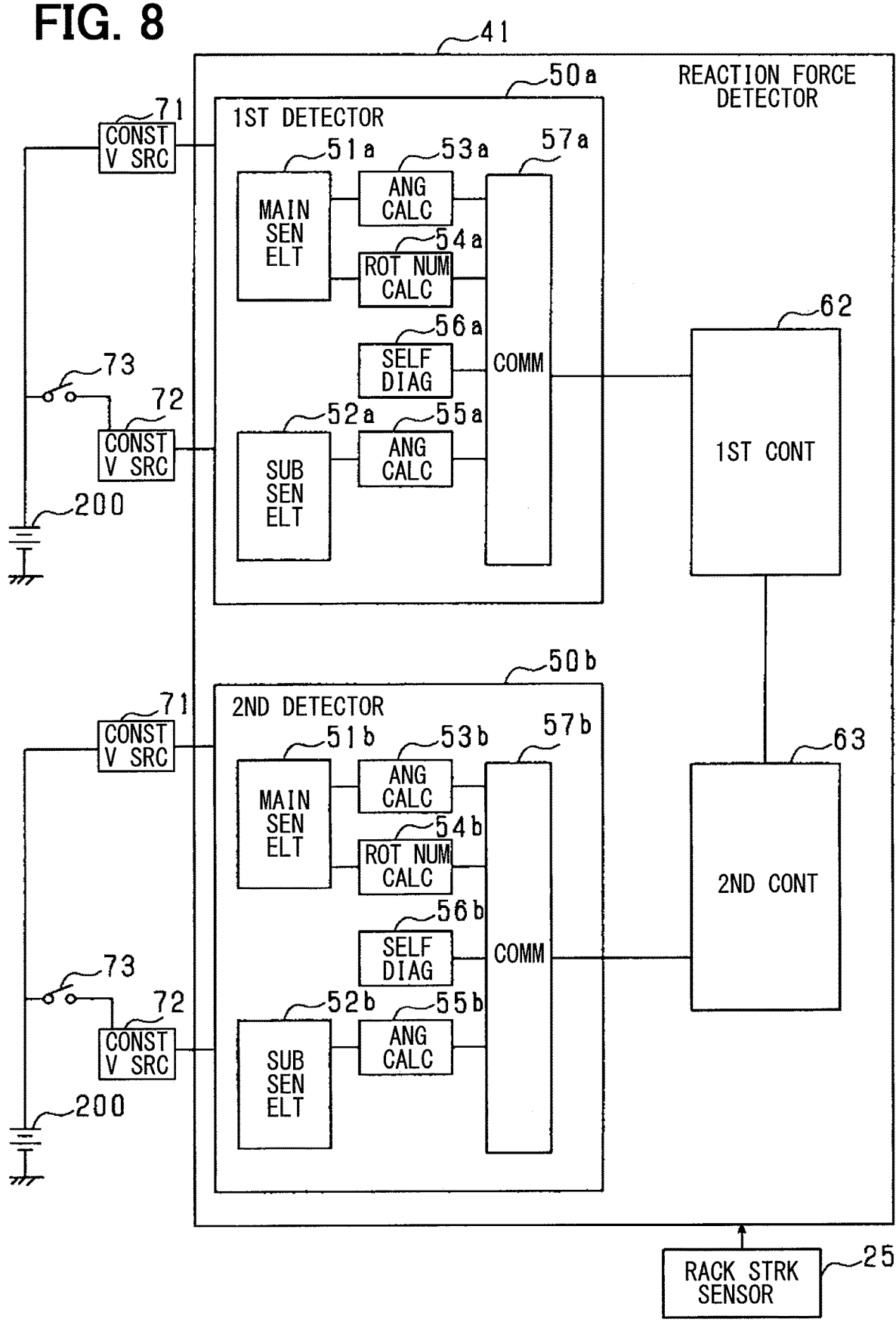
FIG. 8 is a block diagram of the reaction force detector according to a third embodiment of the present disclosure.

FIG. 8 is a block diagram of the steering system 100 according to the present embodiment. In the present embodiment, the reaction force detector 41 includes, as controllers, a first control unit 62 connected to the first detector 50a and a second control unit 63 connected to the second detector 50b. The first control unit 62 and the second control unit 63 can communicate by using known inter-microcomputer communication.

When an output signal is communicated between the first control unit 62 and the second control unit 63, a frame used for communication includes a "run counter" signal and a CRC signal as an error detection signal. Therefore, by using the CRC signal, it is determinable whether or not there is a communication error between the first control unit 62 and the second control unit 63. Note that the error detection signal may be other than a CRC signal, such as a checksum signal or the like.

In the reaction force ECU 40 and the turning ECU 45 configured as described above, when a communication abnormality occurs in the communication between the first control unit 62 and the second control unit 63, the determination accuracy of the majority decision using the detection values may deteriorate. Therefore, in the present embodiment, in a situation where a communication abnormality occurs in communication between the first and second control units 62 and 63, the determination accuracy of the majority decision is prevented from falling drastically by including, in the majority decision, a displacement amount X from the rack stroke sensor 25 as an external sensor.

Next, a calculation process of the reaction force absolute angle A1 according to the present embodiment is described with reference to FIG. 9. The process shown in FIG. 9 is repeatedly performed by the first control unit 62 at a predetermined cycle.

As discussed above, at step S11, an output signal including the detection values θm and TC is obtained, and at step S12, the presence or absence of abnormality in the rotation angle θm used for calculation of the reaction force absolute angle A is determined by using each value θm, TC, SS, and CRC that are included in the output signal obtained at step S11.

Figure 9:
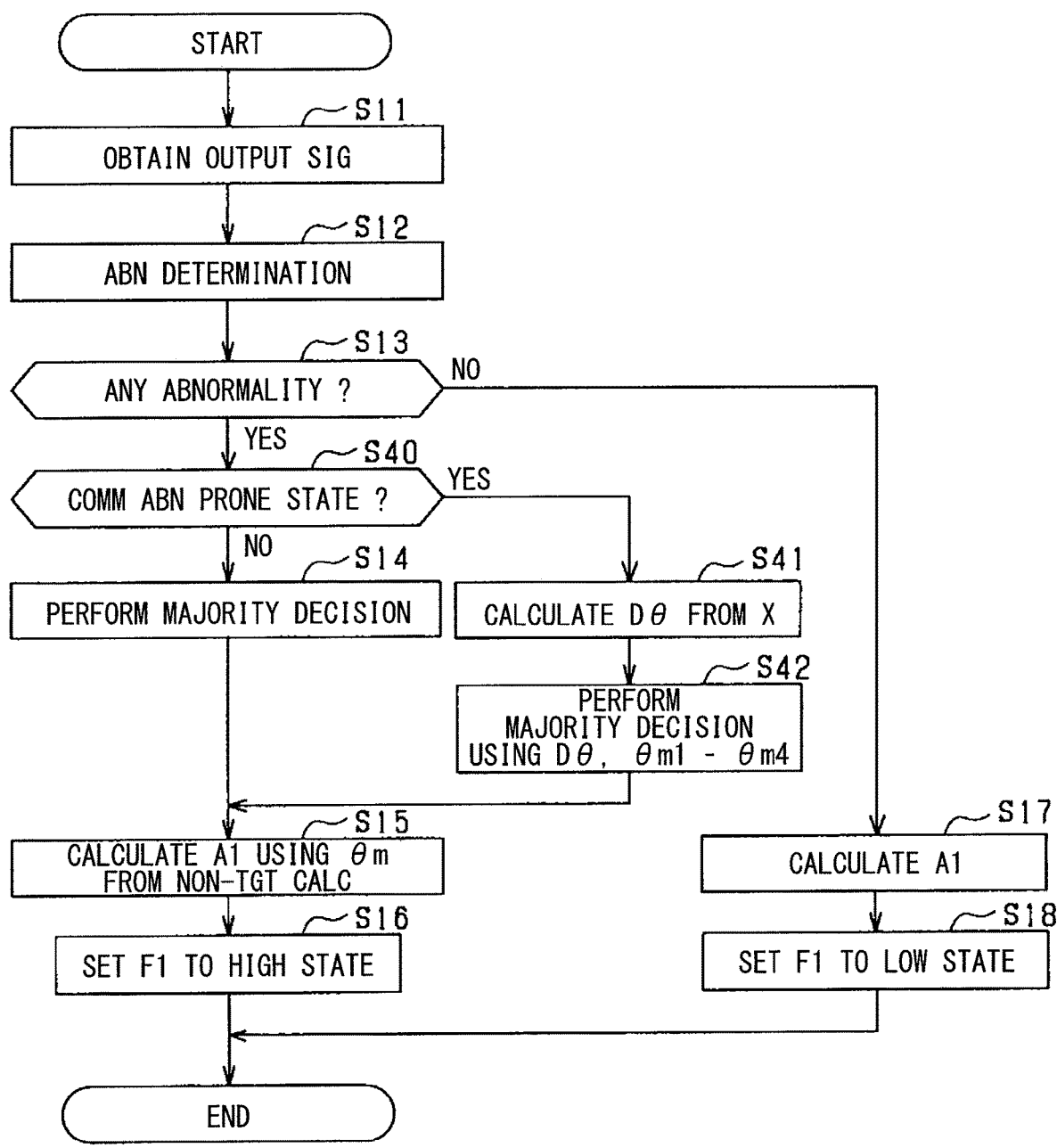
FIG. 9 is a flowchart of the calculation procedure of the reaction force absolute angle according to the third embodiment of the present disclosure.

When it is determined at step S13 that the detection value is abnormal, the process proceeds to step S40, and it is determined whether or not it is in a situation prone to a communication abnormality ("COMM ABN PRONE STATE" in FIG. 9). In the present embodiment, it is determined whether or not a communication abnormality is occurring by using a CRC signal in a communication frame. Step S40 corresponds to a determination unit.

When it is determined that the situation is not an abnormality-prone situation in which a communication abnormality occurs, a negative determination is made at step S40, and the process proceeds to step S14. At step S14, a target calculator in which an abnormality is occurring is identified from among the angle calculators 53a and 55a by majority decision by using the rotation angles θm1 to θm4.

On the other hand, when it is determined that the situation is abnormality-prone, in which the communication abnormality may occur, an affirmative determination is made at step S40, and the process proceeds to step S41. At step S41, a rotation angle Dθ for comparison, which is information using the displacement amount X output from the rack stroke sensor 25, is calculated. In the present embodiment, the rotation angle Dθ for comparison is calculated from the displacement amount X based on the following equation (2).

$$D\theta = A3(X) - INT(TC/4) \times 360 \qquad (2)$$

Here, A3(X) indicates an absolute angle for determination calculated based on the displacement amount X, which is, for example, a value obtained by dividing the displacement amount X by the reduction ratio of the turning side speed reduction gear 23. In addition, the absolute angle for determination may simply be described as "A3." Step S41 corresponds to an obtainer.

At step S42, a target calculator is identified from among the angle calculators 53a and 53b by a majority decision by using the rotation angle Dθ for comparison in addition to the rotation angles θm1 to θm4. In the present embodiment, as the majority decision, from among the rotation angles θm1 and θm2, one having a low degree of matching with the rotation angles θm3 and θm4 and the rotation angle Dθ for comparison is determined as an abnormal value. Then, one of the angle calculators 53a and 55a that has calculated a rotation angle with the low degree of matching is identified as a target calculator in which an abnormality is occurring.

At step S15, the reaction force absolute angle A1 is calculated by using the rotation angles θm from the angle calculators other than the target calculator identified at step S14 and step S42.

The following effects are achievable in the present embodiment.

The first and second control units 62 and 63, when determining that the detection value used for the calculation of the reaction force absolute angle A1 is abnormal, identifies a target calculator based on the result of comparison between (i) the rotational angles θm1 and θm2 and (ii) the rotation angle Dθ for comparison calculated by using the displacement amount X detected by the rack stroke sensor 25. Then, calculation of the reaction force absolute angle A1 is continued by using the rotation angles θm calculated by the angle calculators other than the target calculator. In such case, the amount of information used for the majority decision is increasable, thereby preventing the deterioration of the determination accuracy for identifying the target calculator.

The first and second control units 62 and 63 determine that the accuracy of the comparison result using the detection value is low in a situation prone to communication abnormality in which the detection value is obtained, and identify a target calculator by using an output value from the rack stroke sensor 25. In such case, it is possible to prevent the accuracy of identification of the target calculator from falling drastically due to the communication abnormality.

Modification of Third Embodiment

The reaction force detector 41 may identify the rotation number calculators 54a and 54b that calculate an abnormal number of rotations TC. In such case, at step S41, a number of rotations DTC for comparison, which is information using the displacement amount X detected by the rack stroke sensor 25, is calculated. In the present embodiment, the number of rotations DTC for comparison is calculated by using the displacement amount X according to the following equation (3).

$$DTC = INT(A3(X), 90) \qquad (3)$$

INT(A3(X), 90) represents a quotient obtained by dividing the absolute angle A3(X) for determination by 90 degrees, which is a count interval of the number of rotations TC.

Then, at step S42, in addition to using the number of rotations TC, the majority decision is made by using the number of rotations DTC for comparison, for identifying a target calculator which is calculating an abnormal number of rotations TC from among the rotation number calculators 54a and 54b.

The first and second control units 62 and 63 may be configured not to identify a target calculator in which the abnormality is occurring when it is determined as a situation in which the communication abnormality is occurring. In such case, after it is determined as a situation in which the communication abnormality is occurring, an affirmative determination may be made at step S40, and the process of FIG. 9 may be once ended. Alternatively, the affirmative determination may be made at step S40, and the process may proceed to step S17. In such case, steps S41 and S42 are omitted.

Fourth Embodiment

The third embodiment is different from the first embodiment for the following points as described below. In the third embodiment, same structural parts/configuration are designated with the same reference numerals as the first embodiment for simplification of description.

In the present embodiment, the first and second control units 62 and 63 of the reaction force detector 41 identify a rotation number calculator calculating an abnormal number of rotations TC in addition to identifying the angle calculator calculating the abnormal rotation angle θm.

Figure 10:
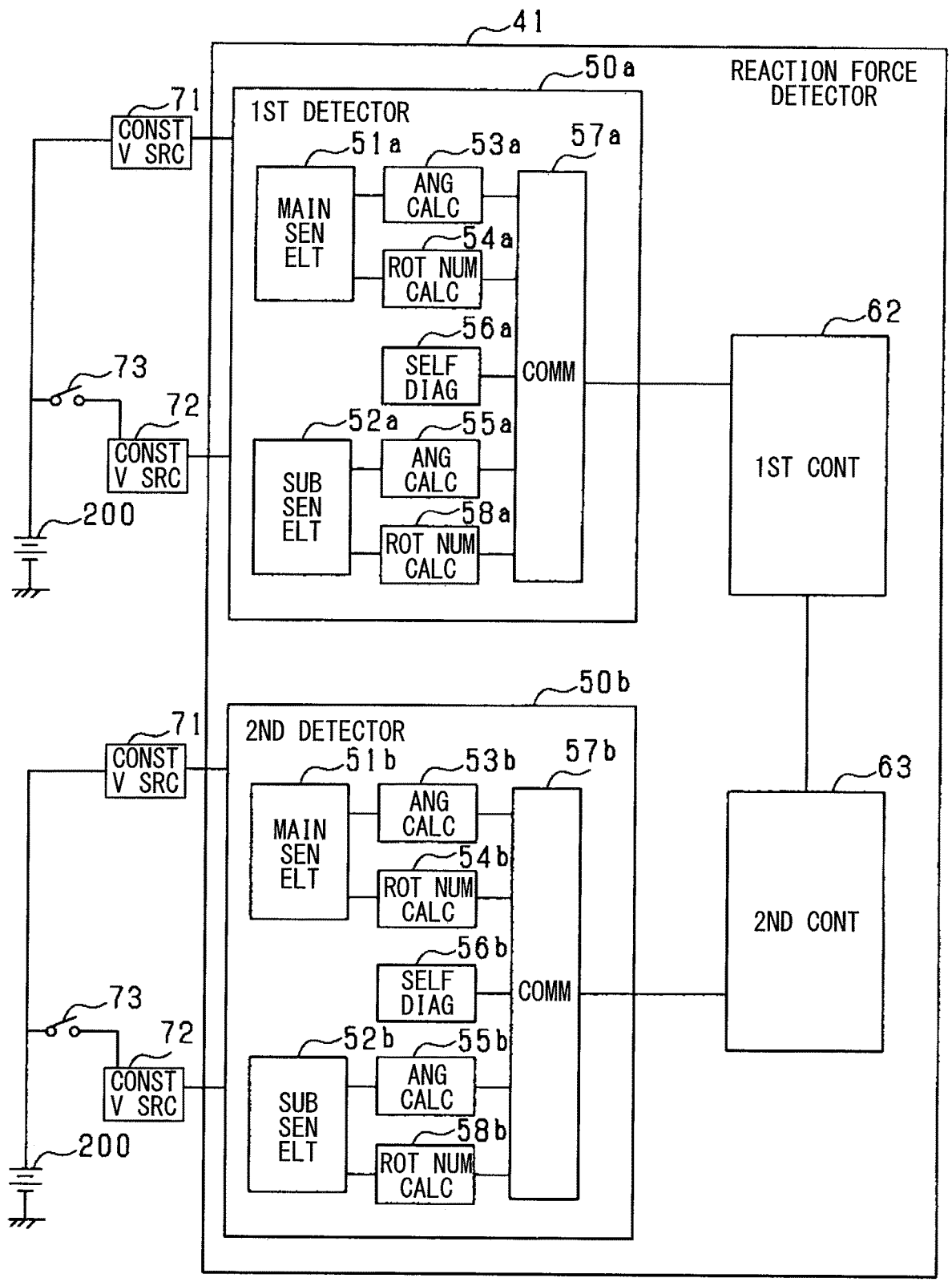
FIG. 10 is a block diagram of the reaction force detector according to a fourth embodiment of the present disclosure.

FIG. 10 is a block diagram of the reaction force detector 41 according to the present embodiment. In the present embodiment, the first detector 50a includes the rotation number calculator 54a and a rotation number calculator 58a as a calculator that calculates the number of rotations TC. In addition, the second detector 50b includes the rotation number calculator 54b and a rotation number calculator 58b as a calculator.

Figure 11:
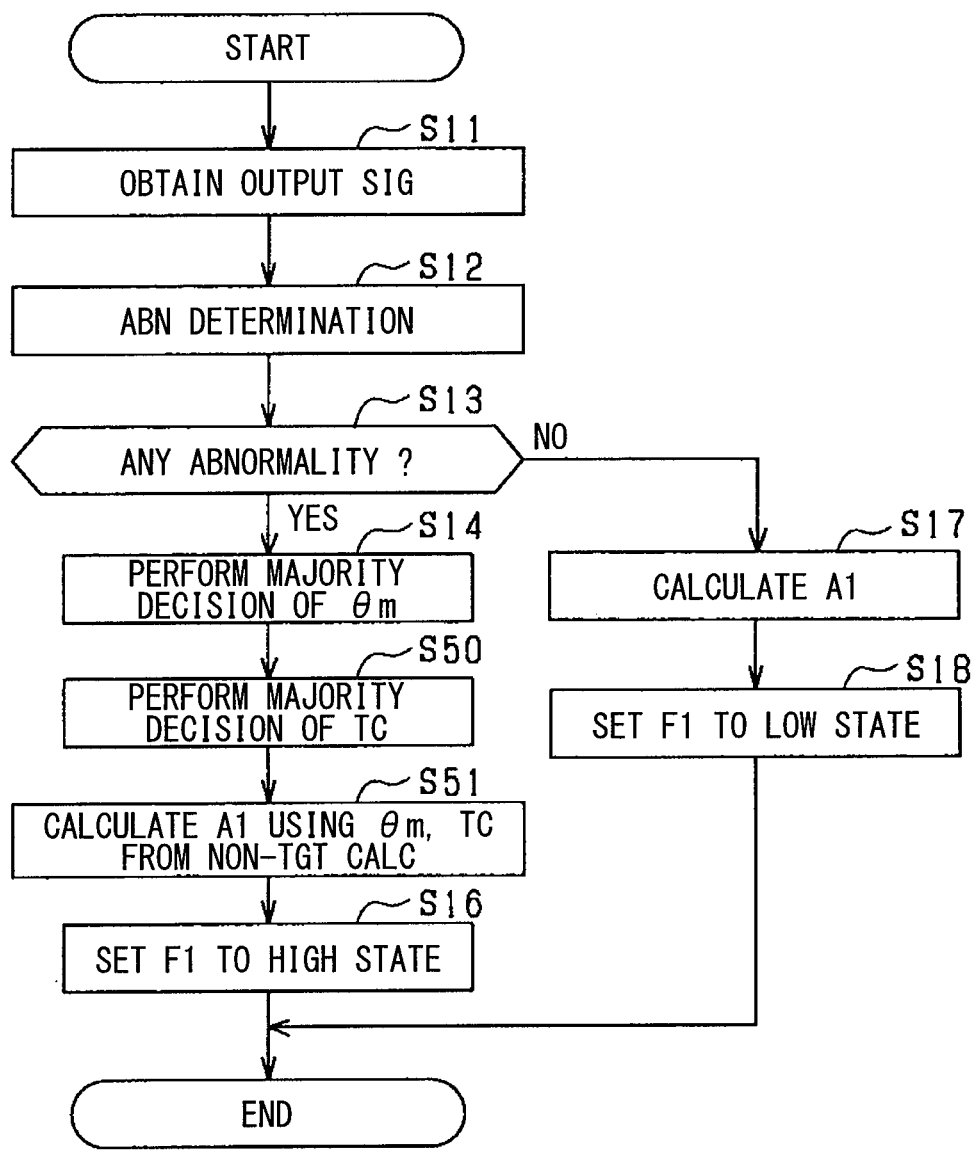
FIG. 11 is a flowchart of the calculation procedure of the reaction force absolute angle according to the fourth embodiment of the present disclosure.

Next, a calculation process of the reaction force absolute angle A1 according to the present embodiment is described with reference to FIG. 11. The process shown in FIG. 11 is repeatedly performed by the first control unit 62 at a predetermined cycle.

When it is determined at step S13 that the detection value is abnormal, the process proceeds to step S14. At step S14, a target calculator that is calculating an abnormal rotation angle θm is identified from among the angle calculators 53a and 55a by performing the majority decision by using the rotation angles θm1 to θm4 calculated by the angle calculators 53a, 53b, 55a, 55b.

At step S50, by the majority decision of using the number of rotations TC1 to TC4 calculated by the rotation number calculators 54a, 54b, 58a, 58b, a target calculator that is calculating the abnormal number of rotations TC is identified from among the rotation number calculators 54a and 58a.

At step S51, the reaction force absolute angle A1 is calculated by using the rotation angle θm and the number of rotations TC from other calculators other than the target calculator identified at step S14 and step S50. Note that, when the target calculator is identified only at one of step S14 and step S50, the rotation angle θm and/or the number of rotations TC not used for such identification of the target calculator may be used for the calculation of the reaction force absolute angle A1.

At step S13, when abnormality of the detection value is not determined, the process proceeds to step S17, and the reaction force absolute angle A1 is calculated based on the current detection value. Then, after performing step S18, the process of FIG. 11 is once ended.

In the present embodiment described above, in addition to the identification of the angle calculator that is calculating the abnormal rotation angle θm, it is possible to identify a rotation number calculator that is calculating the abnormal number of rotations TC. In such case, even when an abnormality is occurring in the angle calculators 53a and 55a or in the rotation number calculators 54a and 58a, it is possible to continue calculation of the reaction force absolute angle A1 while suppressing an adverse effect on the reaction force motor 13.

Fifth Embodiment

The fifth embodiment is different from the first embodiment for the following points as described below. In the fifth embodiment, same structural parts/configuration are designated with the same reference numerals as the first embodiment for simplification of description.

In the present embodiment, when the reaction force detector 41 performs majority decision for identifying a target calculator, the detection value calculated by the turning detector 46 is used in addition to the detection value calculated by the subject device (i.e., by the reaction force detector 41).

Next, a calculation process of the reaction force absolute angle A1 according to the present embodiment is described with reference to FIG. 12. In the process shown in FIG. 12, the control unit 60 of the reaction force detector 41 repeatedly performs the process at a predetermined cycle.

When it is determined at step S13 that an abnormality is occurring in the detection value, an output signal from the turning detector 46 is obtained by communication at step S61. At step S62, it is determined whether or not it is in a situation in which communication abnormality is occurring in the communication with the turning ECU 45.

When it is determined at step S62 that communication abnormality is occurring, a number of rotations DTC for comparison is calculated at step S63, by using the displacement amount X detected by the rack stroke sensor 25, which is used in the majority decision. In the present embodiment, the number of rotations DTC for comparison is calculated from the displacement amount X by using the above equation (3).

At step S64, a majority decision is performed by using (i) the number of rotations DTC for comparison, (ii) the number of rotations TC1 and TC2 calculated respectively by the rotation number calculators 54a and 54b of the subject device, and (iii) the number of rotations TC3 and TC4 calculated respectively by the rotation number calculators 54c and 54d of the turning detector 46.

When it is determined at step S62 that it is not in a situation in which the communication abnormality is occurring, a majority decision is performed at step S65 by using the number of rotations TC1 and TC2 and the number of rotations TC3 and TC4. At step S66, the reaction force absolute angle A1 is calculated by using the number of rotations TC from the calculators other than the target calculator identified at step S64 or step S65, which is the one chosen from among the number of rotations TC1 and TC2.

In the present embodiment, when it is determined at step S13 that no abnormality is occurring in the detection value, the number of rotations TC set as the number of rotations TC used for calculation of the reaction force absolute angle A1 is used for the calculation of the reaction force absolute angle A1 at step S67. Then, after passing through step S18, the process of FIG. 12 is once ended.

In the present embodiment described above, the same effects as the first embodiment are achievable. In addition, in the present embodiment, the reaction force ECU 40 performs the process shown in FIG. 5 to set the neutral position Ma by using the reaction force absolute angle A1.

Modification of Fifth Embodiment

In the present embodiment, an angle calculator calculating an abnormal rotation angle θm may be identified. In such case, at step S63, the rotation angle Dθ for comparison used in the majority decision is calculated by using the displacement amount X detected by the rack stroke sensor 25. Then, at steps S64 and S65, by performing a majority decision using the rotation angle θm, an angle calculator calculating an abnormal rotation angle θm may be identified.

Figure 12:
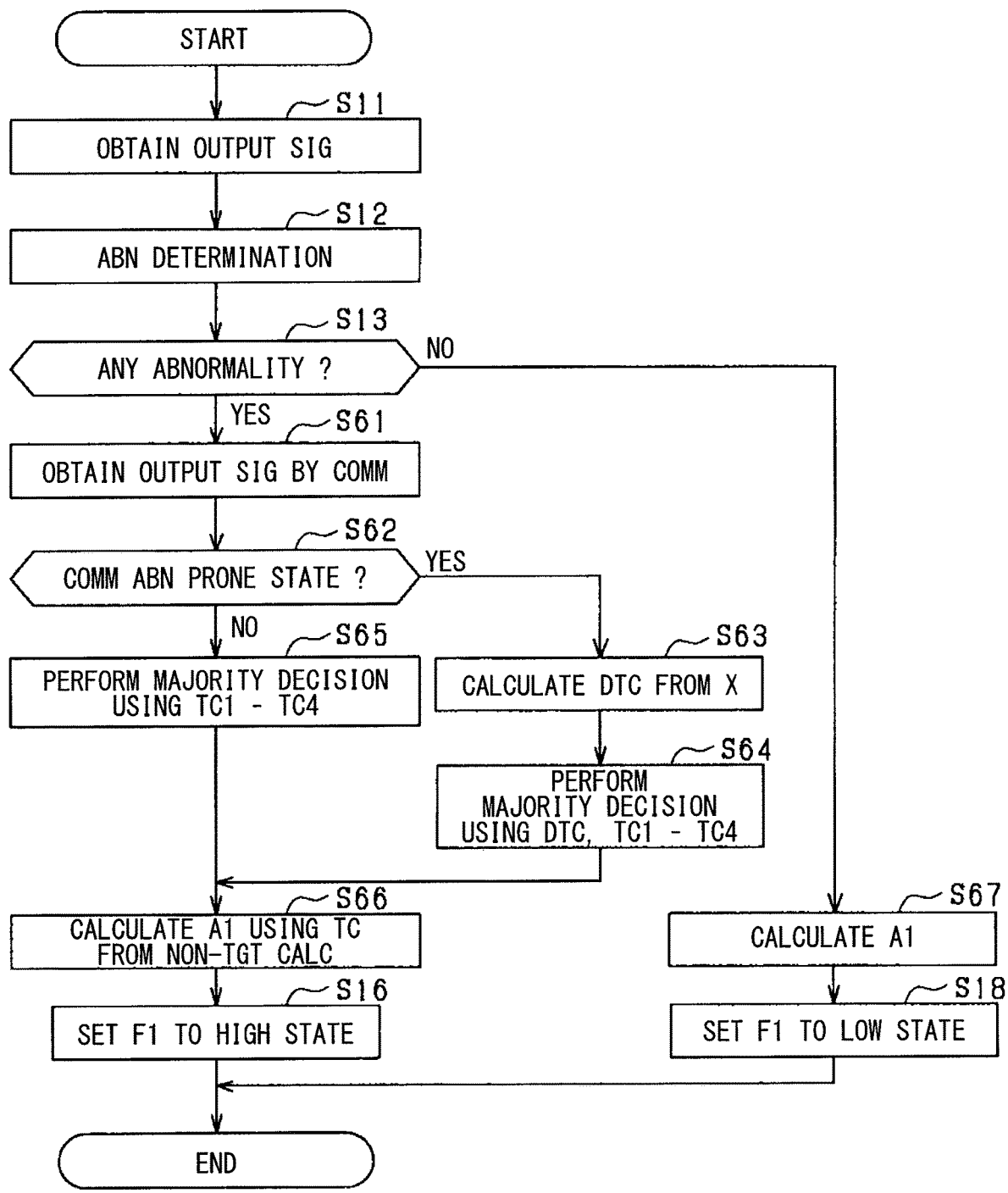
FIG. 12 is a flowchart of the calculation procedure of the reaction force absolute angle according to a fifth embodiment of the present disclosure.

In the present embodiment, the control unit 61 of the turning detector 46 may calculate the turning absolute angle A2 by divertedly using the process shown in FIG. 12.

Further, when setting the neutral position Mb by using the calculated turning absolute angle A2, the turning ECU 45 may set the neutral position Mb by the process shown in FIG. 7.

Sixth Embodiment

The sixth embodiment is different from the third embodiment for the following points as described below. In the sixth embodiment, same structural parts/configuration are designated with the same reference numerals as the third embodiment for simplification of description.

In the present embodiment, the reaction force detector 41 includes the first control unit 62 and the second control unit 63 as controllers. Further, the reaction force detector 41 uses one of the reaction force absolute angles A11 and A12 calculated by the first control unit 62 and the second control unit 63 as an absolute angle to control the reaction force motor 13.

Figure 13:
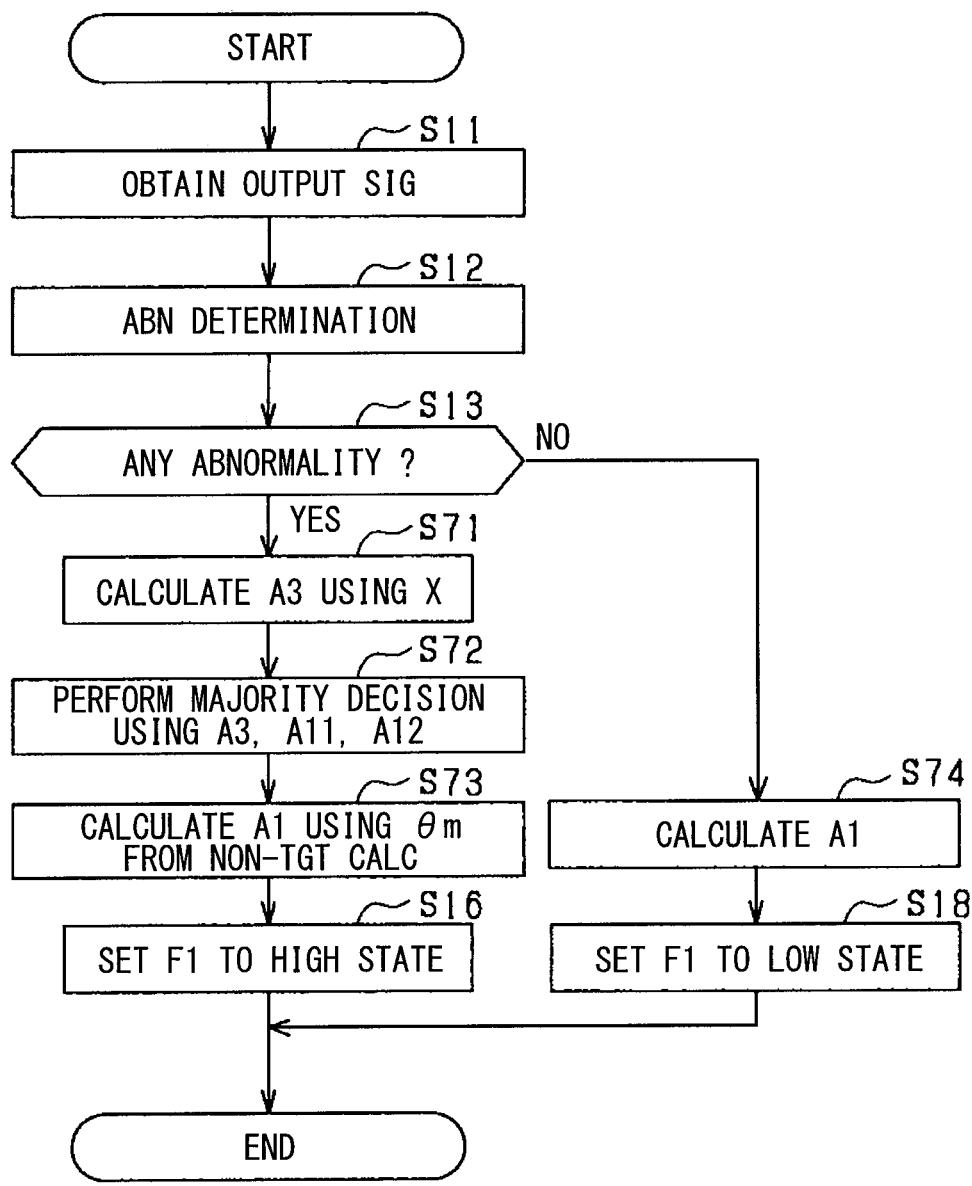
FIG. 13 is a flowchart of the calculation procedure of the reaction force absolute angle according to a sixth embodiment of the present disclosure.

Next, a calculation process of the reaction force absolute angle A1 according to the present embodiment is described with reference to FIG. 13. The process shown in FIG. 13 is repeatedly performed by the first control unit 62 of the reaction force detector 41 at a predetermined cycle.

At step S13, when it is determined that the detection value is abnormal, the process proceeds to step S71, and an absolute angle A3(X) which is the rotation information calculated by using the displacement amount X that is output from the rack stroke sensor 25 is calculated. For example, the absolute value A3(X) for determination is calculated by dividing the displacement amount X by the reduction ratio of the turning side speed reduction gear 23. Step S71 corresponds to an obtainer.

At step S72, a majority decision is performed by using (i) the absolute angle A3(X) for determination calculated at step S71, (ii) the reaction force absolute angle A11 calculated by the first control unit 62, and (iii) the reaction force absolute angle A12 calculated by the second control unit 63. For example, when the absolute angle A3(X) for determination is closer to the reaction force absolute angle A11 than to the reaction force absolute angle A12, it is determined that an abnormality is occurring in each of the calculators in the second detector 50b. On the other hand, when the absolute angle A3(X) for determination is closer to the reaction force absolute angle A12 than to the reaction force absolute angle A11, it is determined that an abnormality is occurring in each of the calculators in the first detector 50a.

At step S73, the reaction force absolute angle A11 is calculated by using the detection values from calculators other than the target calculator which has been identified as abnormal at step S72. For example, when it is determined at step S72 that an abnormality is occurring in each of the calculators provided in the first detector 50a, the detection values θm and TC of the second detector 50b are obtained from the second control unit 63 by communication. Then, the reaction force absolute angle A11 is calculated by using the detection values θm and TC of the second detector 50b.

At step S16, the abnormality notification flag F1 is set to the high state, and the process of FIG. 13 is once ended. When it is determined at step S13 that no abnormality is detected in the detection value, the absolute angle is calculated by using the detection values which are currently selected as the detection values θm, TC to be used for the calculation of the reaction force absolute angle A11.

The same/similar effects as the first embodiment are achievable by the present embodiment described above.

Modification of Sixth Embodiment

When the reaction force ECU 40 or the turning ECU 45 includes three or more control units, the majority decision may be performed by using the displacement amount X from the rack stroke sensor 25, on condition of determining that it is in a situation in which communication abnormality is occurring in communication between/among those control units.

Figure 14:
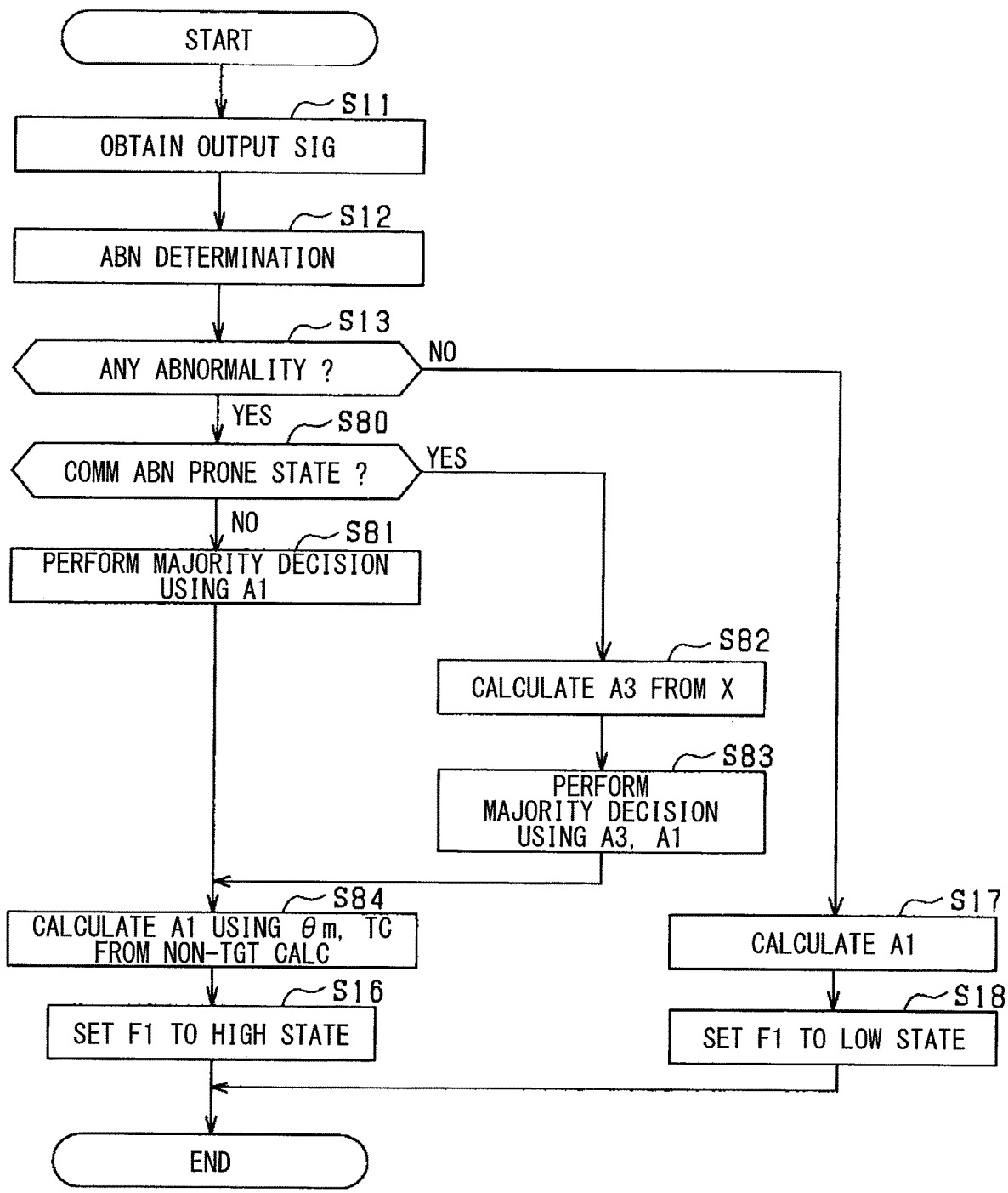
FIG. 14 is a flowchart of the calculation procedure of the reaction force absolute angle according to a modification of the sixth embodiment of the present disclosure.

The calculation procedure of the reaction force absolute angle A1 according to the present embodiment (i.e., modification of the sixth embodiment) is described with reference to a flowchart of FIG. 14. After it is determined at step S13 that an abnormality is occurring in the detection value, when it is determined at step S80 that the communication abnormality is not occurring, the process proceeds to step S81. At step S81, a majority decision is performed by using the reaction force absolute angles A1 calculated by each of the control units in the reaction force ECU 40.

When a degree of matching of any of the reaction force absolute angles A1 is lower than other degrees of matching of other reaction force absolute angles A1, which is determinable by a majority decision performed at step S81, it is determined that an abnormality is occurring in a calculator that has calculated the detection values θm and TC used for the calculation of such a reaction force absolute angle A1. Therefore, at step S84, the reaction force absolute angle A1 is calculated by using the detection values θm and TC calculated by calculators other than the target calculator identified at step S81.

On the other hand, when it is determined at step S80 that a communication error is occurring, the process proceeds to step S82. At step S82, the absolute angle A3(X) for determination is calculated by using the displacement amount X from the rack stroke sensor 25. At step S83, a majority decision is performed by using the determination absolute angle A3(X) and each of the reaction force absolute angles A1 calculated by the respective control units.

When a degree of matching of the reaction force absolute angle A1 calculated by any of the control units is lower than other degrees of matching of the other reaction force absolute angles A1, which is determinable by the majority decision performed at step S83, it is determined that an abnormality is occurring in a calculator that has calculated the detection values θm and TC used for the calculation of such a reaction force absolute angle A1. At step S84, the reaction force absolute angle A1 is calculated by using the detection values θm and TC calculated by calculators other than the target calculator identified at step S83.

In the embodiment described above, it is possible to suppress/prevent the accuracy of identification of the target calculator from falling drastically due to the communication abnormality.

OTHER EMBODIMENTS

The steering system 100 may be an electric power steering system of an electric assist type, as well as the steering system of the steer-by-wire type. In such case, a motor in such system which serves as a detection target may be configured as shown in FIGS. 15 and 16.

Figure 15:
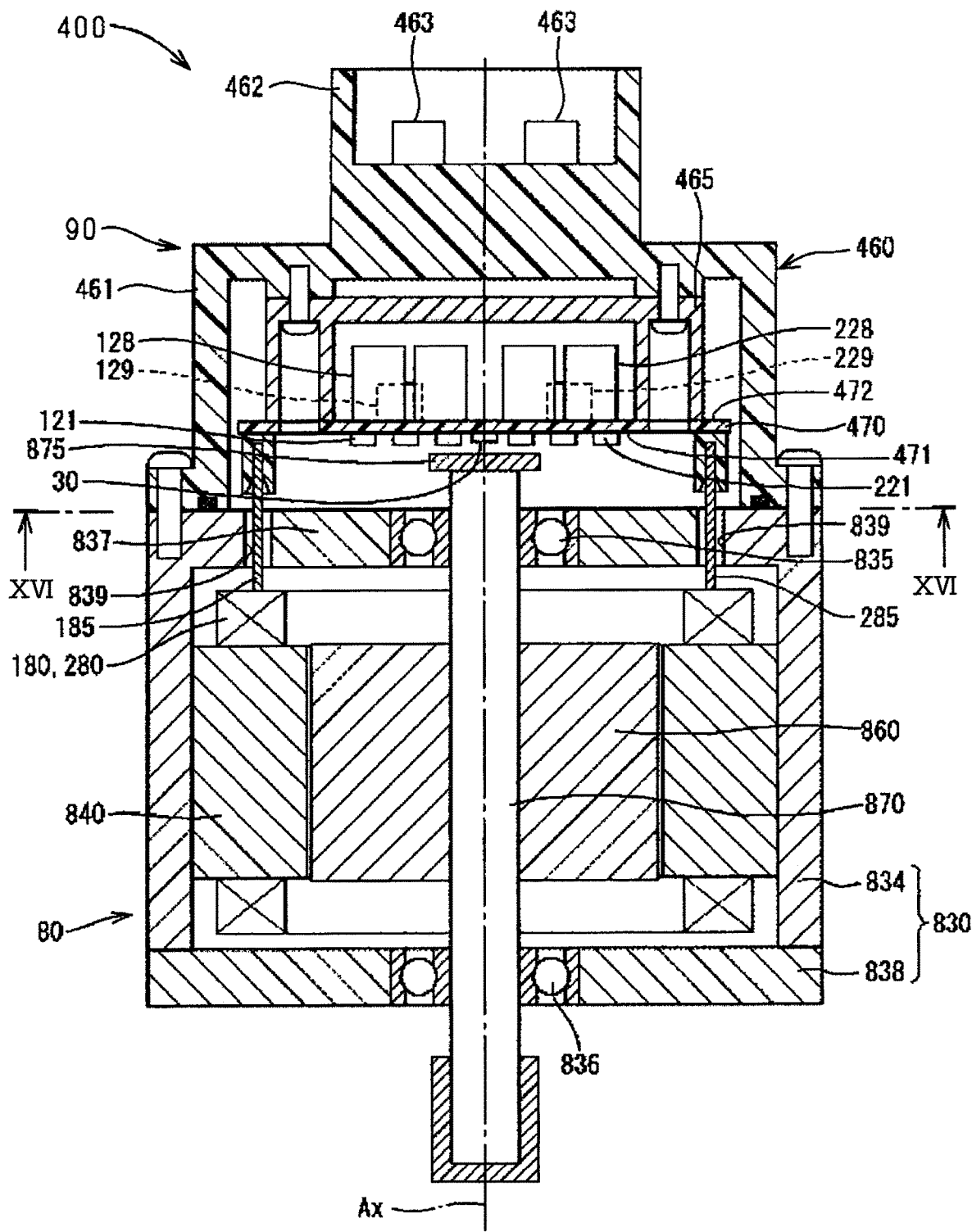
FIG. 15 is an illustration of a configuration of a motor as a modification example.
Figure 16:
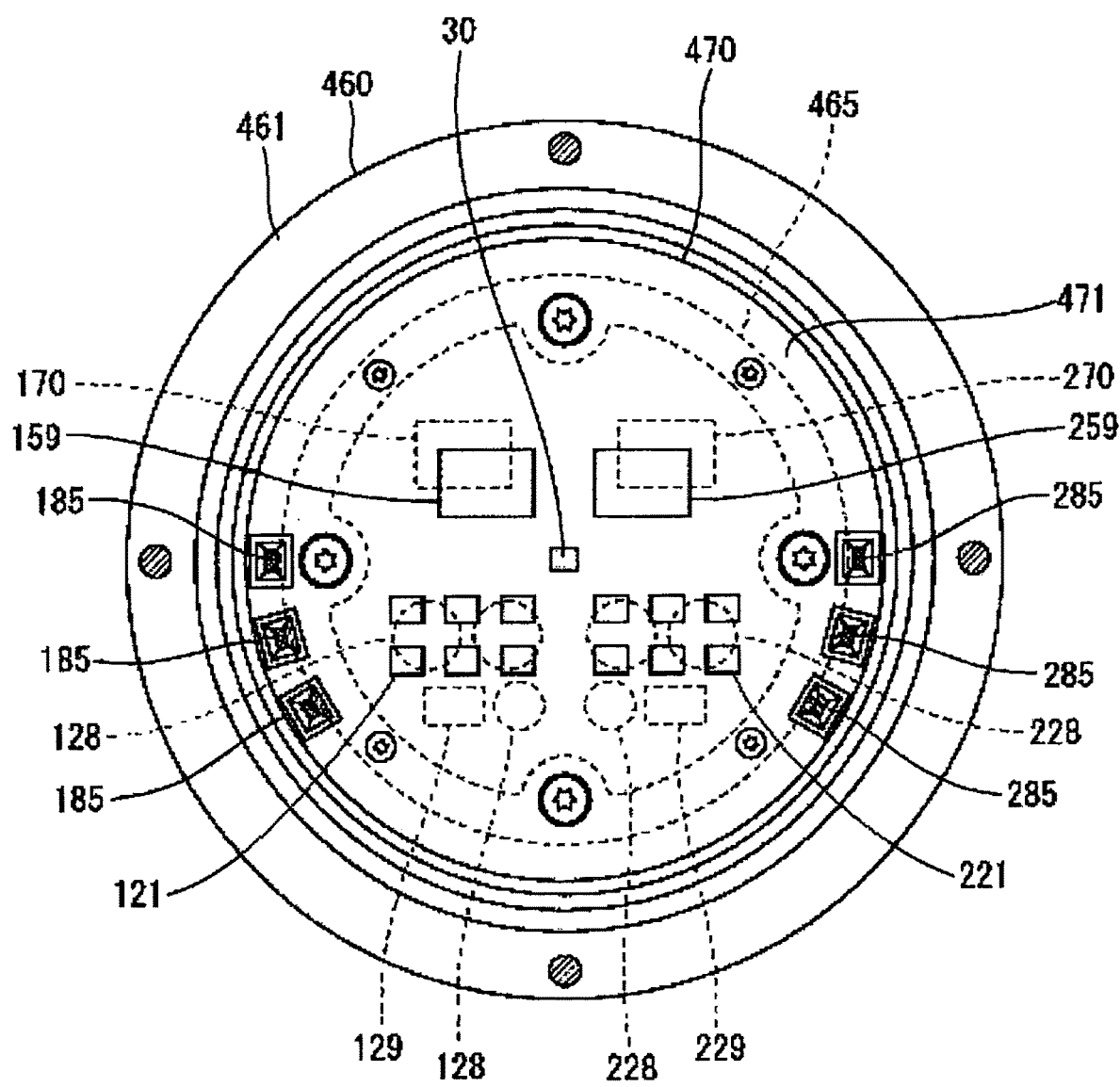
FIG. 16 is an illustration of a configuration of the motor as another modification example.

As shown in FIGS. 15 and 16, a motor 80 outputs a torque for steering partially or entirely, and is driven by the electric power supplied from the battery to rotate the speed reduction gear in forward and reverse directions. The motor 80 is a three-phase brushless motor, and has a rotor 860 and a stator 840.

The motor 80 has a first motor winding 180 and a second motor winding 280 as two sets of winding. The motor windings 180 and 280 have the same electrical characteristics, and are wound around the stator 840 with their electrical angles shifted from each other by 30 degrees. Correspondingly, phase currents are controlled to be supplied to the motor windings 180 and 280 with a phase difference φ of 30 degrees. By optimizing a current supply phase difference, the output torque is improved. Further, a sixth-order torque ripple is reduced. Furthermore, merits of cancellation of noise and vibration are maximized by an optimization of the current supply phase difference, due to the averaged electric current. Also, heat generation is averaged among the different systems, thereby enabling the reduction of a temperature-dependent inter-system error, which is typically observed in the detection values of various sensors or detected torques, as well as enabling supply amounts of the electric currents averaged among the different systems.

Hereinafter, a combination of a first driver circuit 120, a first sensor unit 130, a first control unit 170 and the like is designated as a first system L1, which is related to a drive control for the first motor winding 180, and a combination of a second driver circuit 220, a second sensor unit 230, a second control unit 270 and the like is designated as a second system L2, which is related to a drive control for the second motor winding 280. The configuration related to the first system L1 is basically indicated with reference numerals of 100, and the configuration related to the second system L2 is basically indicated with reference numerals of 200. In the first system L1 and the second system L2, same or similar configuration is indicated with same reference numbers in the least significant two digits. For the other configuration described below, the term "first" is typically indicated with a suffix "1," and the term "second" is typically indicated with a suffix "2."

In a drive device 400, an ECU 90 is integrally provided on one end in an axial direction of the motor 80, which may be known as a mechanism-controller integrated type. However, the motor 80 and the ECU 90 may be separately disposed. The ECU 90 is positioned coaxially with an axis Ax of a shaft 870 on one end opposite to an output shaft of the motor 80. The ECU 90 may alternatively be provided on an output shaft side of the motor 80. By adopting the mechanism-controller integrated type drive device 400, it may be possible to efficiently put the ECU 90 and the motor 80 in a space-restricted installation position in a vehicle.

The motor 80 includes, in addition to the stator 840 and rotor 860, a housing 830 that houses the stator 840 and the rotor 860, and the like. The stator 840 is fixed to the housing 830 and the motor windings 180 and 280 are wound thereon. The rotor 860 is placed radially inside the stator 840 to be rotatable relative to the stator 840.

The shaft 870 is fitted into the rotor 860 to rotate integrally with the rotor 860. The shaft 870 is rotatably supported by the housing 830 by using bearings 835 and 836. An end portion of the shaft 870 on an ECU 90 side protrudes from the housing 830 toward the ECU 90. A magnet 875 is provided at an axial end of the shaft 870 on the ECU 90 side.

The housing 830 has a bottomed cylindrical case 834 including a rear frame end 837, and has a front frame end 838 placed on an opening of the case 834. The case 834 and the front frame end 838 are fastened to each other by bolts or the like. Lead wire insertion holes 839 are formed in the rear frame end 837. Lead wires 185 and 285 are inserted into the lead wire insertion holes 839 for a connection to each phase of the motor windings 180 and 280. The lead wires 185 and 285 are taken out from the lead wire insertion holes 839 toward the ECU 90 and are connected to a circuit board 470.

The ECU 90 includes a cover 460 and a heat sink 465 fixed to the cover 460 in addition to the circuit board 470 fixed to the heat sink 465. The ECU 90 further includes various electronic components and the like mounted on the circuit board 470.

The cover 460 protects the electronic components from external impacts and prevents dust, water or the like from entering into the ECU 90. The cover 460 is provided as a one-body integrated combination of a cover body 461 and a connector member 462. The connector member 462 may alternatively be separated from the cover body 461. Terminals 463 of the connector member 462 are connected to the circuit board 470 via a wiring (not shown) or the like. The number of connectors and the number of terminals may be arbitrarily changed in correspondence to the number of signals and the like. The connector member 462 is provided at an axial end portion of the drive device 400, and has an opening opened toward a direction opposite to the motor 80.

The circuit board 470 is, for example, a printed circuit board, and is positioned to face the rear frame end 837. On the circuit board 470, the electronic components of the first and second systems are mounted independently for each system so that the two systems are configured to make a fully-redundant system. According to the present embodiment, the electronic components are mounted on the circuit board 47 in one piece. The electronic components may alternatively be mounted on plural circuit boards.

Of two principal surfaces of the circuit board 470, one surface facing the motor 80 is referred to as a motor-side surface 471 and the other surface facing away from the motor 80 is referred to as a cover-side surface 472. As shown in FIG. 16, switching elements 121 forming the driver circuit 120, switching elements 221 forming the driver circuit 220, a rotation angle sensor 30 as a detector, custom ICs 159, 259 and the like are mounted on the motor-side surface 471. The rotation angle sensor 30 is mounted at a position facing the magnet 875 so as to be able to detect a change in the magnetic field caused by rotation of the magnet 875.

On the cover-side surface 472, capacitors 128, 228, inductors 129, 229, and microcomputers forming the control units 170, 270 are mounted. In FIG. 16, reference numerals 170 and 270 are assigned to the microcomputers provided as the control units 170 and 270, respectively. The capacitors 128 and 228 smooth the electric power input from the battery. Further, the capacitors 128 and 228 assist electric power supply to the motor 80 by storing electric charge therein. The capacitors 128 and 228 and the inductors 129 and 229 form a filter circuit to reduce noise transmitted from other devices sharing the battery, and also reduce noise transmitted from the drive device 400 to the other devices sharing the battery. It is noted that, power supply relays, motor relays, current sensors, etc. (not shown in the drawings) are also mounted on the motor-side surface 471 or on the cover-side surface 472.

When the steering system 100 includes a plurality of rotation angle detectors for detecting the rotation angle and the number of rotations of the steering shaft 12, instead of including detectors for detecting the rotation angles of the motors 13 and 22, the steering shaft 12 may serve as a detection target.

The reaction force detector 41 and the turning detector 46 may respectively be provided with three or more detectors instead of the two detectors. Even in such case, an abnormal calculator may be identified by using the rotation angle θm or the number of rotations TC detected by the detectors.

The rotation information may be any information other than the absolute angle, as long as it is calculable from a detection value indicating a rotation state of the detection target.

The detectors 50a to 50d may be configured not to have the sensor elements 51a to 52d.

The external sensor may be not only the rack stroke sensor, but may also be a steering angle sensor.

What is claimed is:

1. A rotation detection device, comprising:
   a plurality of detectors configured to respectively output a detection value according to a rotation of a detection target; and
   an information control unit configured to calculate rotation information related to the rotation of the detection target based on the detection values respectively output from the plurality of detectors, wherein
   the plurality of detectors each include a plurality of calculators respectively calculating the detection value based on an output value of a sensor element that detects the rotation of the detection target,
   the plurality of detectors each including (i) a monitor monitoring abnormality of the detection value detected by respective detectors and (ii) an identifier identifying a calculator calculating an abnormal detection value based on a result of comparison between the detection values respectively calculated by the plurality of calculators when the monitor has determined abnormality of the detection value, and wherein
   continuation of calculation of the rotation information by the information control unit is enabled by performing calculation of the rotation information by using the detection values from the respective calculators other than the calculator identified by the identifier in case of identifying an abnormal calculator.

2. The rotation detection device of claim 1, wherein
   the identifier obtains, via communication, the detection values respectively detected by at least one of the plurality of detectors and the rotation information calculated by the information control unit, and
   when it is determined by the monitor as a situation in which the communication at a time of obtaining the detection value is abnormal, the identifier is configured not to identify the calculator that calculates an abnormal detection value.

3. A rotation detection device, comprising:
   a plurality of detectors configured to respectively output a detection value according to a rotation of a detection target;
   an information control unit configured to calculate rotation information related to the rotation of the detection target based on the detection value output from each of the plurality of detectors, wherein
   the plurality of detectors each include a plurality of calculators respectively calculating the detection value based on an output value of a sensor element that detects the rotation of the detection target, and
   the plurality of detectors each are provided with
   (i) an obtainer obtaining rotation information of the detection target calculated based on an output value of an external sensor for detecting rotation of the detection target,
   (ii) a monitor monitoring abnormality of the detection values detected by the plurality of detectors, and
   (iii) an identifier identifying a calculator calculating an abnormal detection value based on (a) at least one of the detection value of the detectors and the rotation information calculated by the information control unit and (b) the rotation information obtained by the obtainer when the monitor has determined abnormality of the detection value, and
   the information control unit is provided with
   (iv) a calculation continuer configured to continue calculation of the rotation information by using the detection value from respective calculators other than the calculator identified by the identifier.

4. The rotation detection device of claim 3, wherein
   the identifier is configured to:
   obtain, via communication, the detection values respectively detected by the at least one of the plurality of detectors and the rotation information calculated by the information control unit, and
   when it is determined by the monitor as a situation in which the communication at a time of obtaining the detection value is abnormal, identify the calculator calculating the abnormal detection value based on (a) at least one of the detection values respectively detected by the plurality of detectors and the rotation information calculated by the information control unit, and (b) the rotation information obtained by the obtainer, and
   when it is not determined by the monitor as the situation in which the communication at a time of obtaining the detection value is abnormal, identify the calculator calculating the abnormal detection value based on (c) the detection values respectively detected by at least one of the plurality of detectors and the rotation information calculated by the information control unit.

5. A steering system comprising:
   a rotation detection device including:
      a plurality of detectors configured to respectively output a detection value according to a rotation of a detection target; and
      an information control unit configured to calculate rotation information related to the rotation of the detection target based on the detection values respectively output from the plurality of detectors, wherein
      the plurality of detectors each including a plurality of calculators respectively calculating the detection value based on an output value of a sensor element that detects the rotation of the detection target,
      the plurality of detectors each being provided with (i) a monitor monitoring abnormality of the detection value detected by respective detectors and (ii) an identifier identifying a calculator calculating an abnormal detection value based on a result of comparison between the detection values respectively calculated by the plurality of calculators when the monitor has determined abnormality of the detection value, and
      the information control unit is further configured to calculate the rotation information by using the detection values from respective calculators other than the calculator identified by the identifier;
   a steering device susceptible to a steering operation of a driver of a vehicle; and
   a turning device turning a direction of tire, wherein
   the steering device has, as the detection target, a reaction force motor applying a reaction force to the steering device according to the steering operation of the driver, the turning device has, as the detection target, a turning motor applying a turning force to change a direction of a tire, the rotation detection device is provided as both of (a) a reaction force detector for detecting the detection value indicative of a rotation state of the reaction force motor and (b) a turning detector for detecting the detection value indicative of a rotation state of the turning motor, and the detection values output from the plurality of detectors include the detection value from the reaction force detector and the detection value from the turning detector.

6. The steering system of claim 5, wherein
the rotation information is an absolute angle indicative of an amount of rotation of the steering device calculated based on the detection value of the reaction force detector, a reaction force controller is provided in the steering system as a device (i) for calculating a neutral position indicative of an angle of the steering device for a straight travel of a vehicle based on the absolute angle, and (ii) for controlling drive of the reaction force motor based on the calculated neutral position and the absolute angle.

7. The steering system of claim 6, wherein
the reaction force controller calculates the neutral position for controlling drive of the reaction force motor based on the absolute angle calculated by the information control unit, when the monitor in the reaction force detector determines the detection value as abnormal.

8. The steering system of claim 6, wherein
the reaction force controller sets a driver input value as the neutral position, when the monitor of the reaction force detector determines the detection value as abnormal.

9. The steering system of claim 5, wherein
the rotation information is an absolute angle indicative of an amount of rotation of the steering device calculated based on the detection value of the turning detector, a turning controller is provided in the steering system as a device (a) for calculating a neutral position indicative of an angle of the steering device for a straight travel of a vehicle based on the absolute angle, and (b) for controlling drive of the turning motor based on the calculated neutral position.

10. The steering system of claim 9, wherein
the turning controller controls the turning motor so that a tire direction is changed to a direction of straight travel of a vehicle according to an input of the driver, when the monitor of the turning detector determines the detection value as abnormal.

11. The steering system of claim 5, further comprising:
a warning unit providing warning to the driver when the detection value is determined as abnormal by the monitor of the turning detector.

* * * * *